(12) United States Patent
Zohar et al.

(10) Patent No.: US 9,916,113 B2
(45) Date of Patent: *Mar. 13, 2018

(54) SYSTEM AND METHOD FOR MIRRORING DATA

(71) Applicant: INTERNATIONAL BUSINESS MACHINES CORPORATION, Armonk, NY (US)

(72) Inventors: Ofir Zohar, Alfe-Menashe (IL); Haim Helman, Herzelya (IL); Dror Cohen, Herzelya (IL); Shemer Schwarz, Tel Aviv (IL); Yaron Revah, Tel Aviv (IL); Efri Zeidner, Kiryat Mozkin (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/497,873

(22) Filed: Sep. 26, 2014

(65) Prior Publication Data

US 2015/0019828 A1 Jan. 15, 2015

Related U.S. Application Data

(63) Continuation of application No. 11/709,000, filed on Feb. 21, 2007, now Pat. No. 8,850,141, which is a continuation-in-part of application No. 11/123,993, filed on May 6, 2005, now Pat. No. 7,552,309, and a continuation-in-part of application No. 10/706,676, filed on Nov. 12, 2003, now Pat. No. 7,870,334, and a continuation-in-part of application No. 10/701,800, filed on Nov. 5, 2003, now Pat. No. 8,214,588, and a continuation-in-part of application No. 10/620,080, filed on Jul. 15, 2003, now Pat. No. 7,908,413.

(60) Provisional application No. 60/774,611, filed on Feb. 21, 2006.

(51) Int. Cl.
 *G06F 12/00* (2006.01)
 *G06F 3/06* (2006.01)
 *G06F 11/20* (2006.01)

(52) U.S. Cl.
 CPC .............. *G06F 3/065* (2013.01); *G06F 3/067* (2013.01); *G06F 3/0619* (2013.01); *G06F 11/2058* (2013.01); *G06F 11/2079* (2013.01)

(58) Field of Classification Search
 CPC .. G06F 11/2079; G06F 11/2058; G06F 3/065; G06F 3/067; G06F 3/0619
 USPC ........................................................ 711/162
 See application file for complete search history.

(56) References Cited

U.S. PATENT DOCUMENTS

| | | | |
|---|---|---|---|
| 6,453,323 B1 | 9/2002 | Hoshino et al. | |
| 6,766,397 B2 | 7/2004 | O'Hare et al. | |
| 2003/0149848 A1 | 8/2003 | Ibrahim et al. | |
| 2004/0226021 A1* | 11/2004 | Miki et al. | 719/313 |
| 2005/0038968 A1* | 2/2005 | Iwamura et al. | 711/162 |
| 2005/0114591 A1 | 5/2005 | Coronado et al. | |
| 2005/0160275 A1* | 7/2005 | Mitsuoka | G06F 3/0622 713/182 |

(Continued)

*Primary Examiner* — Kalpit Parikh
(74) *Attorney, Agent, or Firm* — Griffiths & Seaton PLLC

(57) ABSTRACT

Disclosed is a data processing and/or storage system. The data processing and/or storage system includes at least two interfaces, wherein each of the at least two interfaces includes a non-dedicated communication port for communicating data to and form external data systems or clients based on a rule base.

12 Claims, 9 Drawing Sheets

(56) References Cited

U.S. PATENT DOCUMENTS

| | | |
|---|---|---|
| 2005/0193167 A1 | 9/2005 | Eguchi et al. |
| 2005/0193179 A1 | 9/2005 | Cochran et al. |
| 2005/0228947 A1 | 10/2005 | Morita et al. |
| 2006/0031648 A1* | 2/2006 | Ishikawa et al. ............. 711/162 |
| 2006/0143497 A1* | 6/2006 | Zohar ................. G06F 11/2058 |
| | | 714/6.23 |
| 2006/0288178 A1* | 12/2006 | Yagawa .............. G06F 11/2058 |
| | | 711/162 |

* cited by examiner

SYSTEM AND METHOD FOR MIRRORING DATA

REFERENCE TO RELATED APPLICATIONS

The present application is a continuation of U.S. patent application Ser. No. 11/709,000, now U.S. Pat. No. 8,850,141, filed on Feb. 21, 2007, which is a continuation-in-part of each of the below listed applications:
(1) "DATA ALLOCATION IN A DISTRIBUTED STORAGE SYSTEM", U.S. patent application Ser. No. 10/620,080, filed on Jul. 15, 2003;
(2) "PARALLEL ASYNCHRONOUS ORDER-PRESERVING TRANSACTION PROCESSING", U.S. patent application Ser. No. 10/701,800, filed on Nov. 5, 2003;
(3) "DATA STORAGE METHODS FOR HIERARCHICAL COPIES", U.S. patent application Ser. No. 11/123,993, Filed on May 6, 2005;
(4) "Distributed task queues in a multiple-port storage system", U.S. patent application Ser. No. 10/706,676, Filed on Nov. 12, 2003; and
(5) U.S. Provisional Patent Application Ser. No. 60/774,611, each of which is hereby incorporated by reference in its entirety.

FIELD OF THE INVENTION

The present invention generally relates to the field of data storage. More specifically, the present invention relates to a system and method for backing up or mirroring data of a data storage server/system.

BACKGROUND OF THE INVENTION

The information age has enabled organizations to absorb, produce and analyze massive volumes of data. Nowadays, information in the form of digital data has become part of the core of many organizations' operations. Consequently, data is presently one of the most valuable assets of many organizations in a variety of fields, and in some cases is considered to be the key asset of the organization.

The events of Sep. 11, 2001 exposed the vulnerability of data systems and the precious data stored therein to terrorist attacks and disasters. The survivability and recoverability of data systems following a terrorist attack or other disasters has thus become a major concern of organizations around the world. It has become a necessity for organizations which are reliant upon the data stored in their data systems to ensure the survivability and the recoverability of the organization's data, such that the organization may quickly and efficiently recover from any event resulting in massive damage to the organization's data systems.

In order to mitigate massive data loss due to damage or other malfunction at a primary data storage server or system, it is common to backup the primary data storage server or system of an organization. For a backup system to successfully avoid the same data loss due to some event at the primary server, the backup system may be distributed and geographically removed from the primary server to ensure that any event which may have damaged the primary server is not likely to also affect the integrity of the backup system. In addition, backup systems may operate substantially in real-time, such that as much as possible of the data stored in the primary server at the instant of a failure is backed up.

It has been suggested to transmit the data stored in the primary storage system to a secondary storage system, commonly referred to as a mirror server or system. The primary storage system and the mirror storage system may be located at different geographical locations, such that any event resulting in physical damage or operational failure of the primary storage system is not likely to damage or cause the operational failure of the backup/mirror storage system. This backup technique is commonly dubbed remote mirroring.

SUMMARY OF THE INVENTION

According to some embodiments of the present invention, there is provided a data storage server/system. According to further embodiments of the present invention, the data storage server/system may be provide data services to data clients including client computers and other data storage systems. According to further embodiments of the present invention, a data storage server/system may provide data mirroring services to another data system.

The general principle behind all data storage remote backup or mirroring systems is that there is content or data on the primary data storage server or system which by definition is to be copied to another server, the mirror server, such that the data and data structure on all or at least a portion of the mirror server is substantially identical to the data and data structure on the primary or principle server. When a primary server or system is first connected and configured to backup its data on a mirror server, all the data on the primary server which should be backed up may be transmitted to, and stored on, the mirror server, thereby producing a substantially identical copy of the data on the primary server. Sometimes, a mirror server may be dedicated to the backup of data from a single primary server, while at other times a single mirror server may store data from multiple primary servers and may even act as a primary server for data clients.

After the initial data copying or synchronization between a primary and a mirror server, data on the primary server is rarely static and may change with any data transaction such as a data write request from a data client. Thus, the primary server/system may transmit to a mirror server/system information relating to any transactions the primary server/system may engage in, which transaction may alter data on the primary server.

There are two general approaches to remote mirroring. In accordance with an approach or method referred to as synchronous remote mirroring, the primary server or system may be configured to acknowledge a transaction only after the data to be stored in the mirror system had been received and fully processed by the mirror system, and was acknowledged by the mirror system. A second approach or method to remote mirroring is known as asynchronous remote mirroring. In accordance with the asynchronous approach to remote mirroring, the primary server's acknowledgment of the transaction may not be contingent upon a response from the mirror server, and in general, no such response may be anticipated by the primary server from the mirror server.

Asynchronous mirroring techniques tend to have reduced latency associated with the remote mirroring process, when compared to synchronous techniques. However, since asynchronous techniques do not guarantee that all data is updated on both severs (the primary server and the mirror server) simultaneously, it is possible that at a given point in time not all the transactions acknowledged by the primary server are properly stored in the mirror server. Nonetheless, the level of data loss may be usually controlled to some degree in some implementations of asynchronous remote mirroring, and it may thus be possible to estimate which data is missing on the mirror server and to compensate for the data gaps which may exist between the transactions acknowledged by the primary server and the data which had been actually stored on the mirror server.

As shown in FIG. 1, which figure includes a block diagram of an exemplary data storage system comprised of a primary server/system, a primary mirror or backup server/system, and a secondary mirror or backup server/system, each of which may be within a data center. Various configurations of data storage servers and/or systems may include: (1) one or more primary data servers, (2) a primary mirror or backup server, and (3) a secondary mirror server. According to the embodiment of FIG. 1, the primary data server may service data read and write requests from one or more data clients, may participate in a synchronous/asynchronous data mirroring connection with the primary mirror server and may participate in a synchronous/asynchronous data mirroring connection with the secondary mirror server.

According to further embodiments of the present invention, the primary data server may participate in an asynchronous data mirroring connection with the primary mirror server and may participate in a synchronous data mirroring connection with the secondary mirror server. According to yet further embodiments of the present invention, the primary data server may participate in asynchronous connections with both the primary and secondary data servers, or it may participate in synchronous connections with both the primary and secondary data servers. In the event that the primary data storage server becomes unable to service requests from data clients, the primary mirror or backup server may begin servicing client data requests and may begin participating in a data mirroring connection with the secondary mirror or backup server.

Shown in FIGS. 2, 3 and 4 are various portions of a data storage system, including a master/primary server/system 10 and two mirroring data storage server/systems 20/30. A master data storage server/system may include a primary mirroring module adapted to be functionally associated with the primary data server and to establish a data mirroring connections with a primary slave mirroring module functionally associated with a primary mirror server and with a secondary slave mirroring module functionally associated with a secondary mirror server. As shown in FIG. 5A, the mirroring module may be part of a dedicated interface and a communication port on the dedicated interface may be responsible for establishing mirroring connections with one or more mirroring server/systems.

According to some embodiments of the present invention, there is provided a data storage server/system adapted to store transaction related data received from client computers, which client computers may also be referred to as host computers. According to further embodiments of the present invention, the data storage system may also be adapted to transmit portions of the stored transaction data to one or more mirror or backup server/systems. According to some embodiments of the present invention, the data storage system may act as a mirror server/system for another data system. According to some embodiments of the present invention, the data storage system may act exclusively as a mirror server/system for one or more external data systems, or alternatively, the data storage system may also provide data storage services to client/host computers.

According to further embodiments of the present invention, each of two or more interfaces may include or be integral with a dynamic non-dedicated communication port adapted to establish a communication session with an external data system such as a mirror or backup server/systems.

Alternatively, if the data storage system is a mirroring system, the dynamic non-dedicated communication ports may be adapted to participate in a communication session with one or more external primary data storage systems. According to yet further embodiments, the dynamic non-dedicated communication ports may be adapted to participate in communication sessions with both external data systems and with data clients/hosts.

According to further embodiments of the present invention, one or more of the ports, connected to or integral with the one or interfaces, are configured during the system's initialization. According to further embodiments of the present invention, port configuration, port allocation and/or port reallocation may be performed dynamically during system operation, based on a rule base and/or feedback regarding overall system performance.

According to some embodiments of the present invention, a data storage system may include at least two interfaces, wherein each of the at least two interfaces may include a dynamic communication port adapted to communicate with one or more external data systems or data clients, and wherein each of said at least two interfaces is adapted to provide the external data system or data client with access to said data storage system based on a policy rule base.

The rule base may be an access policy rule base including information relating to access rights of external data storage systems or data clients. The rule base may indicate that a given external data storage system or client has access rights selected from the group consisting of full access, read only access, write only access, and no-access.

According to some embodiments of the present invention the storage system may include a data table of interface identifiers correlating specific external interfaces with specific external data systems. The table may allow the system to identify which external data system is attempting a transaction the system based on the identifier of the interface which initiates the session. According to some embodiments of the present invention, the rule base is updatable so as to reconfigure port allocation/configuration based on based upon said data storage system load and load distribution. A system controller may monitor system load and may update the rule base accordingly.

According to some embodiments of the present invention, the rule base may include a priority value for one or more external data systems or clients. One or more interfaces include a task queue. The one or more interfaces may place a data request from a given external data system or data client into their respective task queues based upon the priority level assigned to the given external data system or data client in the rule base.

According to some embodiments of the present invention, the policy rule base is a masking policy rule base providing different masking rules for different external data systems and data clients. Based on the masking rule base a given interface may use a first data unit identifier to represent a given set of related data blocks to a first set of external data systems and the given interface may use a second data unit identifier to represent the given set of related data blocks to a second set of external data systems.

According to some embodiments of the present invention, each of two or more interfaces may represent the given related data blocks as a first logical unit to the first set of external data systems and as a second logical unit to the second set of external data systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
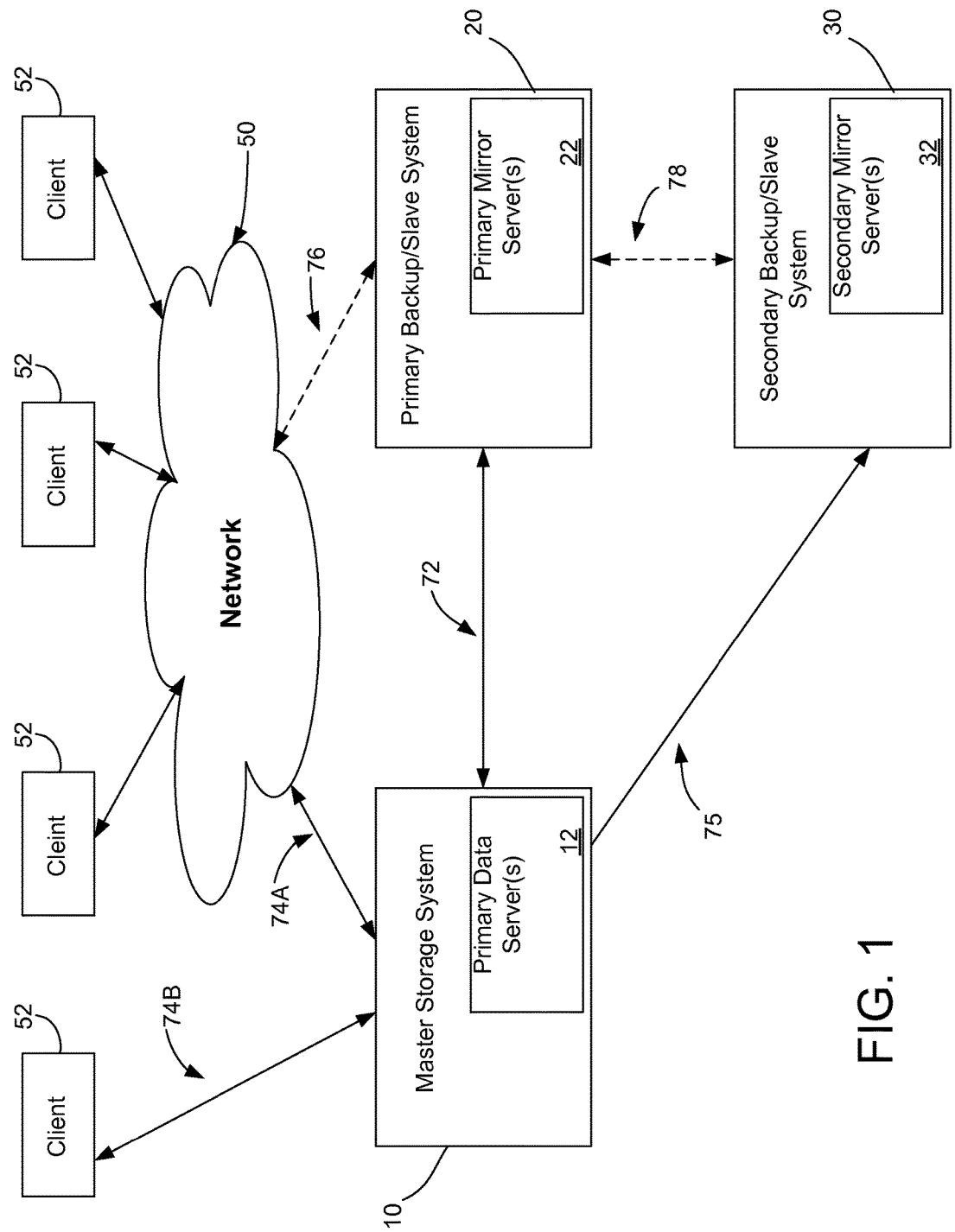
FIG. 1 is a block diagram showing an exemplary data storage architecture including a primary data storage server functionally connected with a primary mirror server and a secondary mirror server according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term "data loss", "loss of data" and the like shall be used to described any situation where data is rendered substantially inaccessible or unusable for any reason whatsoever, and as a result of any event, including but not limited to, the physical destruction of at least a portion of one or more storage devices and/or a critical malfunction of at least a portion of one or more storage devices.

According to some embodiments of the present invention, there is provided a data storage server/system. According to further embodiments of the present invention, the data storage server/system may be provide data services to data clients including client computers and other data storage systems. According to further embodiments of the present invention, a data storage server/system may provide data mirroring services to another data system.

The general principle behind all data storage remote backup or mirroring systems is that there is content or data on the primary data storage server or system which by definition is to be copied to another server, the mirror server, such that the data and data structure on all or at least a portion of the mirror server is substantially identical to the data and data structure on the primary or principle server. When a primary server or system is first connected and configured to backup its data on a mirror server, all the data on the primary server which should be backed up may be transmitted to, and stored on, the mirror server, thereby producing a substantially identical copy of the data on the primary server. Sometimes, a mirror server may be dedicated to the backup of data from a single primary server, while at other times a single mirror server may store data from multiple primary servers and may even act as a primary server for data clients.

After the initial data copying or synchronization between a primary and a mirror server, data on the primary server is rarely static and may change with any data transaction such as a data write request from a data client. Thus, the primary server/system may transmit to a mirror server/system information relating to any transactions the primary server/system may engage in, which transaction may alter data on the primary server.

There are two general approaches to remote mirroring. In accordance with an approach or method referred to as synchronous remote mirroring, the primary server or system may be configured to acknowledge a transaction only after the data to be stored in the mirror system had been received and fully processed by the mirror system, and was acknowledged by the mirror system. A second approach or method to remote mirroring is known as asynchronous remote mirroring. In accordance with the asynchronous approach to remote mirroring, the primary server's acknowledgment of the transaction may not be contingent upon a response from the mirror server, and in general, no such response may be anticipated by the primary server from the mirror server.

Asynchronous mirroring techniques tend to have reduced latency associated with the remote mirroring process, when compared to synchronous techniques. However, since asynchronous techniques do not guarantee that all data is updated on both severs (the primary server and the mirror server) simultaneously, it is possible that at a given point in time not all the transactions acknowledged by the primary server are properly stored in the mirror server. Nonetheless, the level of data loss may be usually controlled to some degree in some implementations of asynchronous remote mirroring, and it may thus be possible to estimate which data is missing on the mirror server and to compensate for the data gaps which may exist between the transactions acknowledged by the primary server and the data which had been actually stored on the mirror server.

As shown in FIG. 1, which figure includes a block diagram of an exemplary data storage system comprised of a primary server/system, a primary mirror or backup server/system, and a secondary mirror or backup server/system, each of which may be within a data center. Various configurations of data storage servers and/or systems may include: (1) one or more primary data servers, (2) a primary mirror or backup server, and (3) a secondary mirror server. According to the embodiment of FIG. 1, the primary data server may service data read and write requests from one or more data clients, may participate in a synchronous/asynchronous data mirroring connection with the primary mirror server and may participate in a synchronous/asynchronous data mirroring connection with the secondary mirror server.

According to further embodiments of the present invention, the primary data server may participate in an asynchronous data mirroring connection with the primary mirror server and may participate in a synchronous data mirroring connection with the secondary mirror server. According to yet further embodiments of the present invention, the primary data server may participate in asynchronous connections with both the primary and secondary data servers, or it may participate in synchronous connections with both the primary and secondary data servers. In the event that the primary data storage server becomes unable to service requests from data clients, the primary mirror or backup server may begin servicing client data requests and may begin participating in a data mirroring connection with the secondary mirror or backup server.

Figure 2:
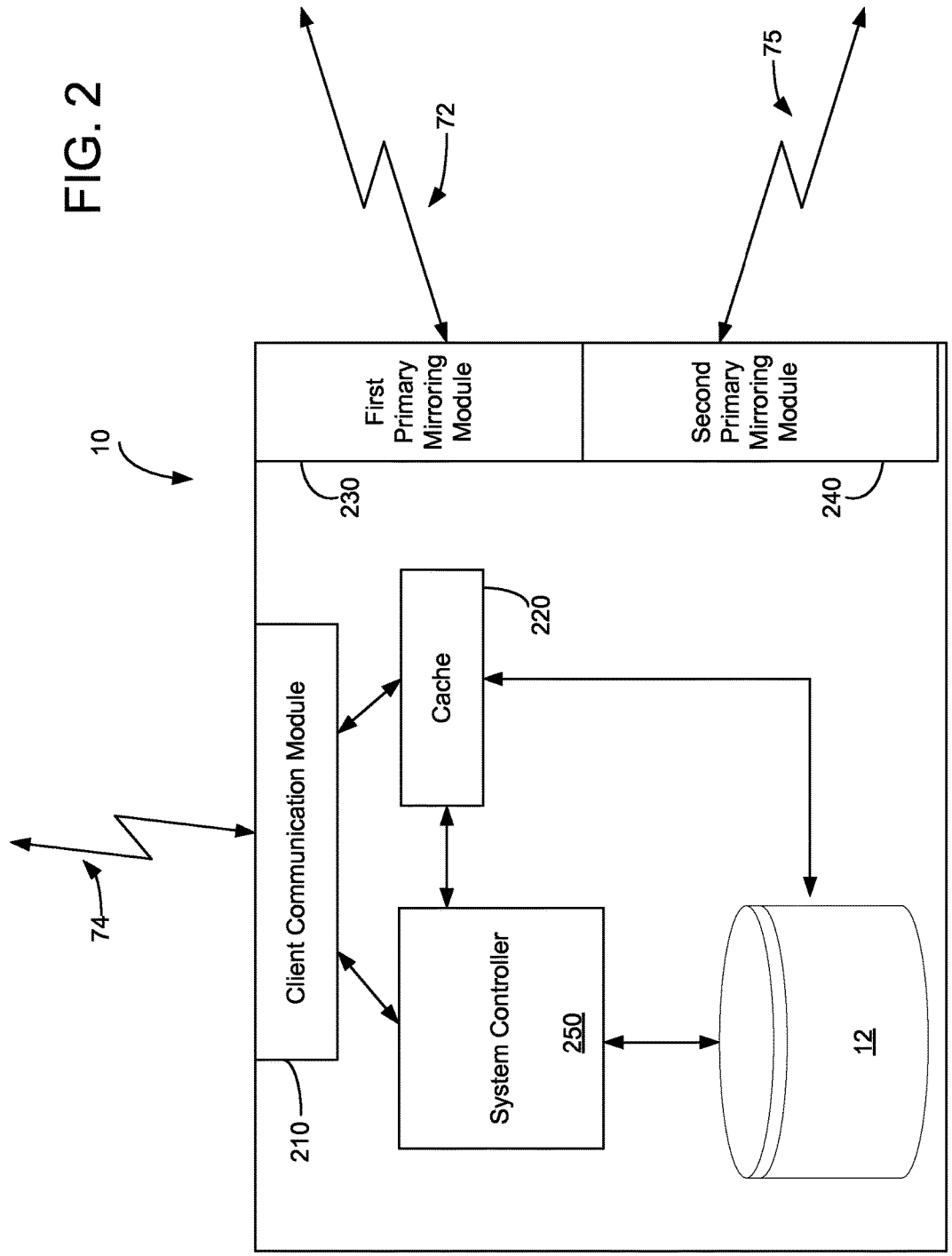
FIG. 2 is a block diagram showing an exemplary primary data server according to some embodiments of the present invention.
Figure 3:
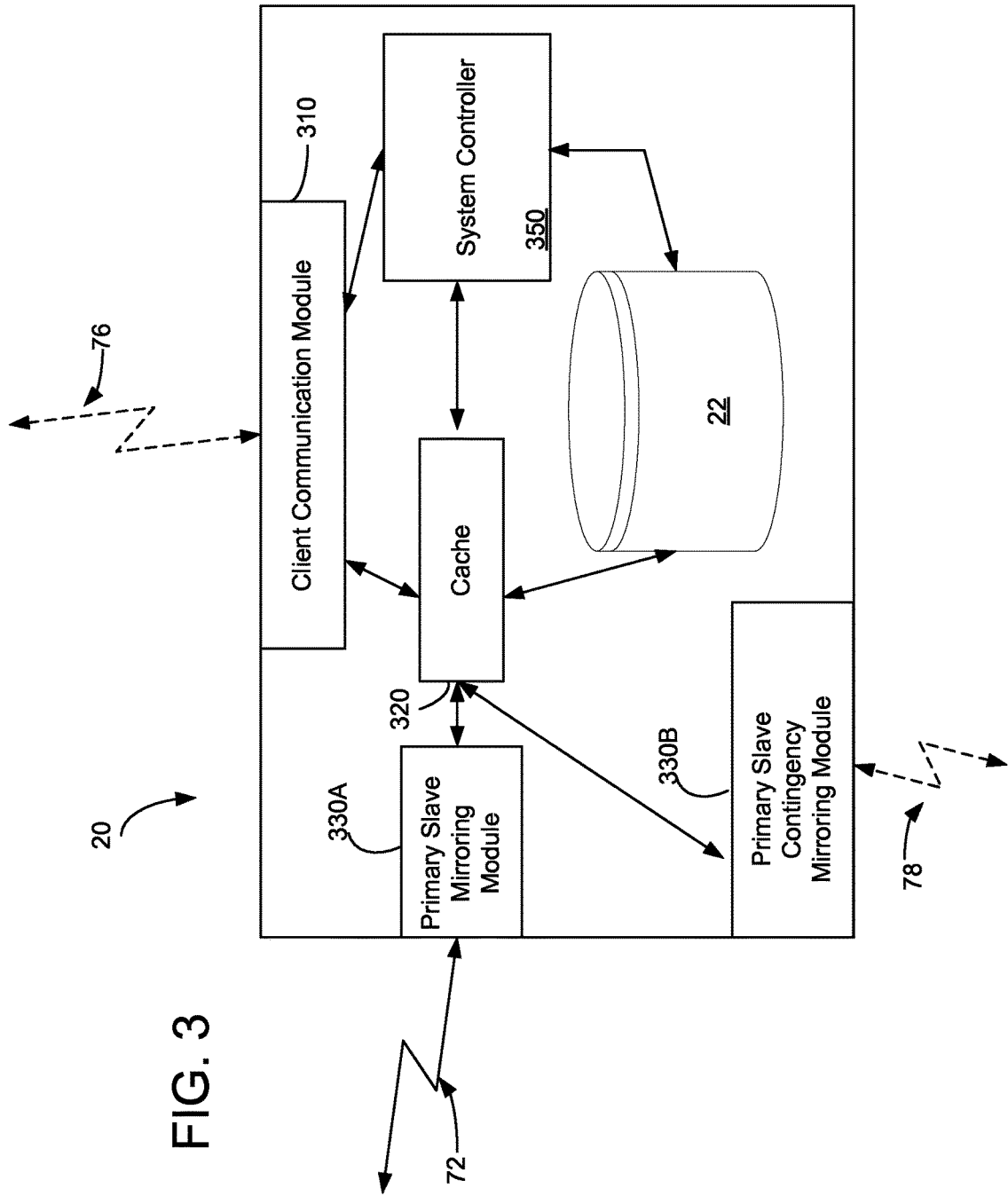
FIG. 3 is a block diagram showing an exemplary first mirror server according to some embodiments of the present invention.
Figure 4:
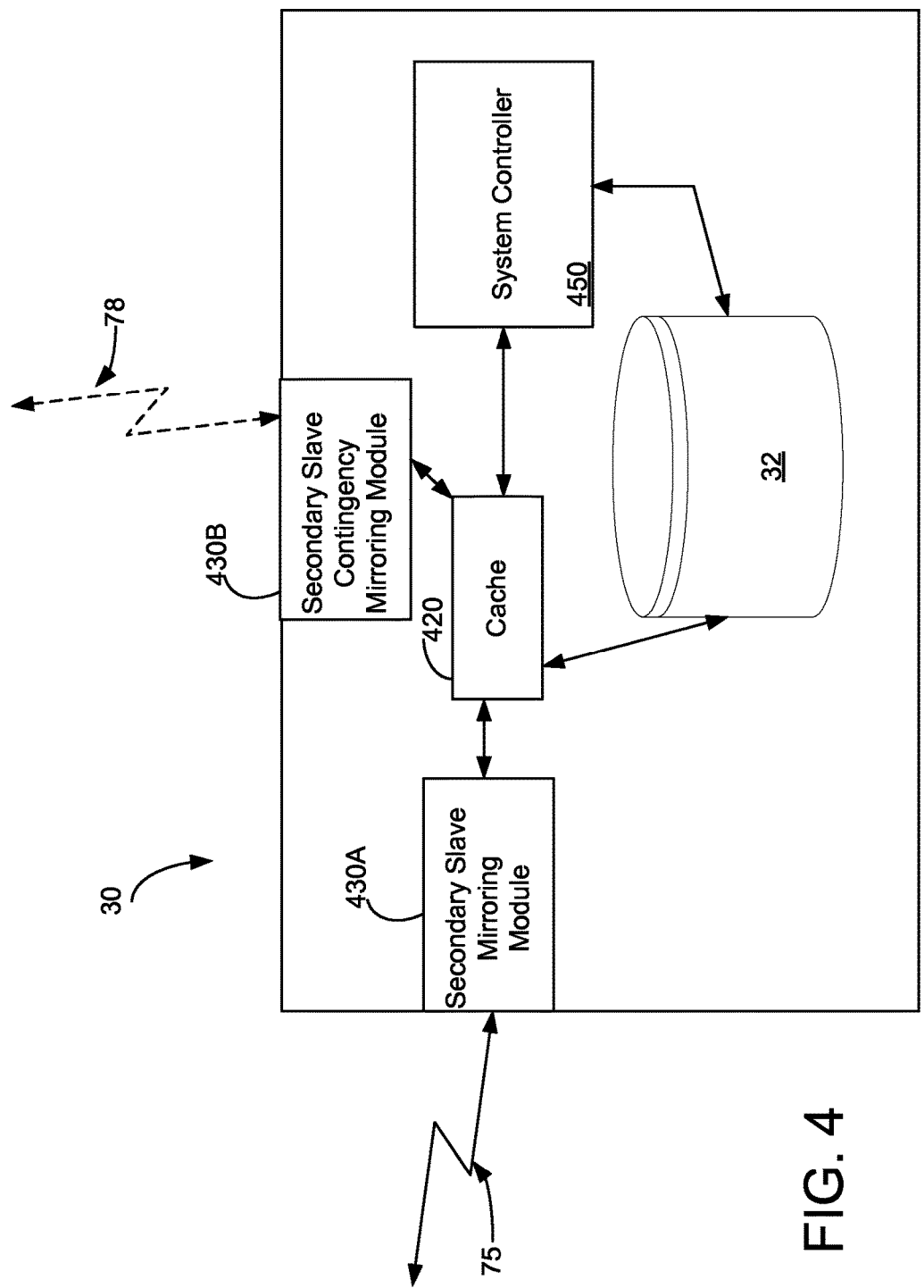
FIG. 4 is a block diagram showing an exemplary secondary mirror server according to some embodiments of the present invention.
Figure 5A:
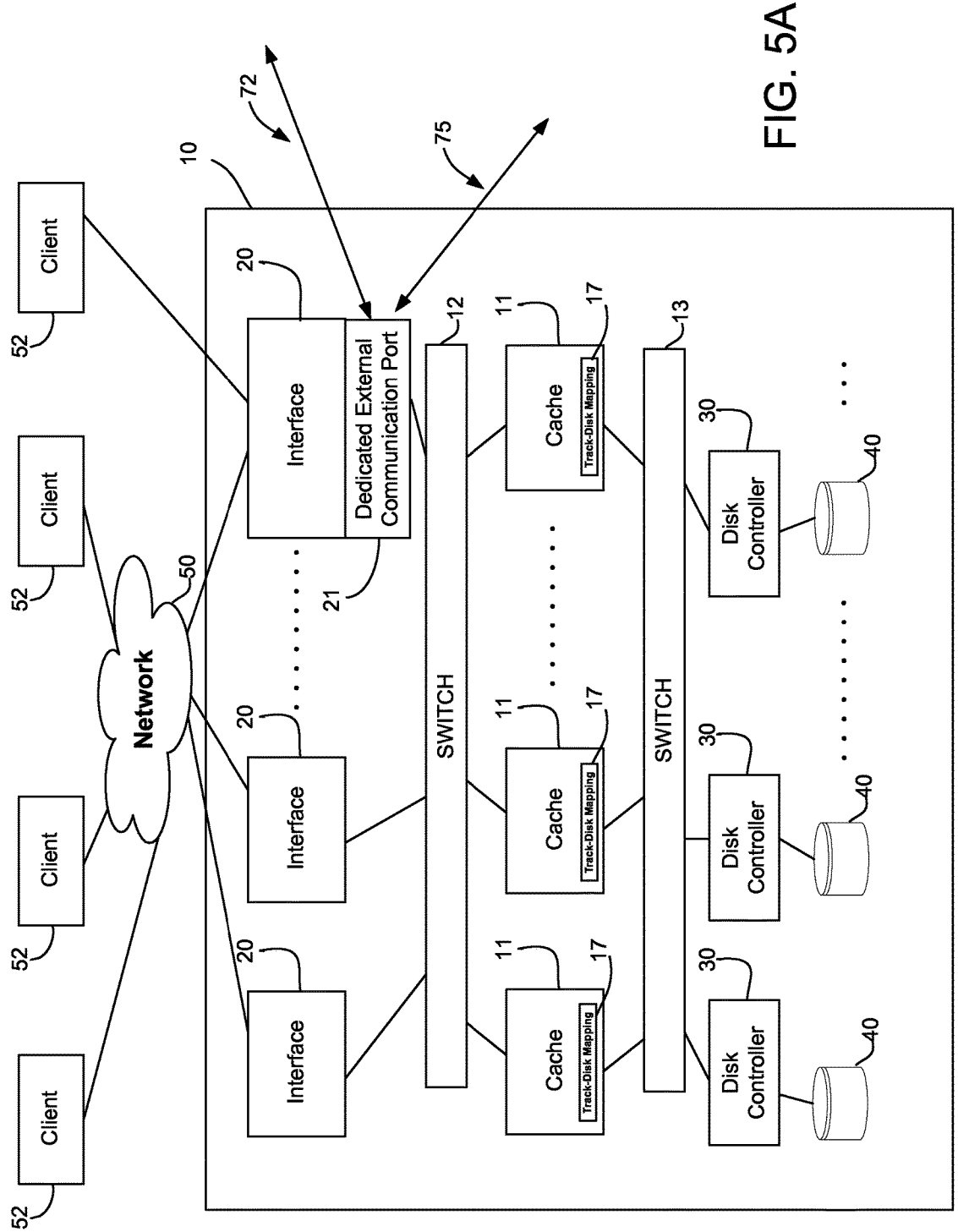
FIG. 5A is a block diagram of an exemplary data storage server/system where a dedicated interface includes a communication port for communicating one or more mirror/back-up servers/systems.

Shown in FIGS. 2, 3 and 4 are various portions of a data storage system, including a master/primary server/system 10 and two mirroring data storage server/systems 20/30. A master data storage server/system may include a primary mirroring module adapted to be functionally associated with the primary data server and to establish a data mirroring connections with a primary slave mirroring module functionally associated with a primary mirror server and with a secondary slave mirroring module functionally associated with a secondary mirror server. As shown in FIG. 5A, the mirroring module may be part of a dedicated interface and a communication port on the dedicated interface may be responsible for establishing mirroring connections with one or more mirroring server/systems.

According to some embodiments of the present invention, there is provided a data storage server/system adapted to store transaction related data received from client computers, which client computers may also be referred to as host computers. According to further embodiments of the present invention, the data storage system may also be adapted to transmit portions of the stored transaction data to one or more mirror or backup server/systems. According to some embodiments of the present invention, the data storage system may act as a mirror server/system for another data system. According to some embodiments of the present invention, the data storage system may act exclusively as a mirror server/system for one or more external data systems, or alternatively, the data storage system may also provide data storage services to client/host computers.

According to further embodiments of the present invention, each of two or more interfaces may include or be integral with a dynamic non-dedicated communication port adapted to establish a communication session with an external data system such as a mirror or backup server/systems. Alternatively, if the data storage system is a mirroring system, the dynamic non-dedicated communication ports may be adapted to participate in a communication session with one or more external primary data storage systems. According to yet further embodiments, the dynamic non-dedicated communication ports may be adapted to participate in communication sessions with both external data systems and with data clients/hosts.

According to further embodiments of the present invention, one or more of the ports, connected to or integral with the one or interfaces, are configured during the system's initialization. According to further embodiments of the present invention, port configuration, port allocation and/or port reallocation may be performed dynamically during system operation, based on a rule base and/or feedback regarding overall system performance.

According to some embodiments of the present invention, a data storage system may include at least two interfaces, wherein each of the at least two interfaces may include a dynamic communication port adapted to communicate with one or more external data systems or data clients, and wherein each of said at least two interfaces is adapted to provide the external data system or data client with access to said data storage system based on a policy rule base.

The rule base may be an access policy rule base including information relating to access rights of external data storage systems or data clients. The rule base may indicate that a given external data storage system or client has access rights selected from the group consisting of full access, read only access, write only access, and no-access.

According to some embodiments of the present invention the storage system may include a data table of interface identifiers correlating specific external interfaces with specific external data systems. The table may allow the system to identify which external data system is attempting a transaction the system based on the identifier of the interface which initiates the session. According to some embodiments of the present invention, the rule base is updatable so as to reconfigure port allocation/configuration based on based upon said data storage system load and load distribution. A system controller may monitor system load and may update the rule base accordingly.

According to some embodiments of the present invention, the rule base may include a priority value for one or more external data systems or clients. One or more interfaces include a task queue. The one or more interfaces may place a data request from a given external data system or data client into their respective task queues based upon the priority level assigned to the given external data system or data client in the rule base.

According to some embodiments of the present invention, the policy rule base is a masking policy rule base providing different masking rules for different external data systems and data clients. Based on the masking rule base a given interface may use a first data unit identifier to represent a given set of related data blocks to a first set of external data systems and the given interface may use a second data unit identifier to represent the given set of related data blocks to a second set of external data systems.

According to some embodiments of the present invention, each of two or more interfaces may represent the given related data blocks as a first logical unit to the first set of external data systems and as a second logical unit to the second set of external data systems.

Reference is now made to FIG. 1, which is a block diagram illustration of a data server mirroring system, in accordance with some embodiments of the present invention. As part of some embodiments of the present invention, a master storage system 10 including a primary data server 12 may be in communication with one or more hosts 52. As part of some embodiments of the present invention, the master storage system 10 may be configured to service read and/or write requests generated by one or more of the clients or hosts 52. The clients 52 may be connected to the master storage system 10 either directly, through communication link 74B, or via a network 50, through communication link 74A.

Server/client configurations and methodologies are well-known in the art and shall not be described in detail in the present application. However, it should be noted that, as part of some embodiments of the present invention, the data server mirror system, method and circuit of the present invention may be implemented with any presently known or yet to be devised in the future server-client configuration and/or methodology.

In accordance with some embodiments of the present invention, the master storage system 10 may be connected to a first or a primary backup or slave system 20 through a first synchronization communication link 72. The primary slave system 20 may include a primary or a first mirror server 22. The primary mirror server 22 may be adapted to receive and store data arriving from the master storage system 10 over the first synchronization communication link 72.

In accordance with some embodiments of the present invention, the primary slave system 20 may be configured to synchronously mirror on the primary mirror server 22 data that is stored or that is to be stored in the primary data server 12. In accordance with further embodiments of the present invention, the primary slave system 20 may be configured to synchronously mirror data that is stored or that is to be stored in the primary data server 12 on the primary mirror server 22, such that a substantially identical copy of the data stored in the primary data server 12 is stored in the primary mirror server 22.

Various synchronous data mirroring techniques are known in the art. The present invention is not limited to the use of any one particular synchronous data mirroring technique. Rather, in accordance with some embodiments of the present invention, any synchronous data mirroring technique presently known or yet to be devised in the future may be used to mirror data that is stored or that is to be stored in the primary data server 12 on the primary mirror server 22.

For illustration purposes, a description of one non-limiting example of a general synchronous data mirroring technique which may be used in accordance with some embodiments of the present invention is provided herein. In accordance with one exemplary embodiment of the present invention, the master storage system 10 may receive a write request from a client 52. Upon the receipt of the data, the storage system 10 may place the data in a cache memory (not shown) associated with the master storage system 10. Next, the master storage system 10 may simultaneously forward the data received from the clients 52 to a primary data server 12 which may be associated with the master storage system 10 and to the primary slave system 20 over the first mirroring link 72.

In accordance with some embodiments of the present invention, when the data arrives at the primary slave system 20 the data may be stored in the primary mirror server 22. In accordance with some embodiments of the present invention, once the data is stored in the primary mirror server 22 the primary slave system 20 may generate an acknowledgement signal and may transmit the acknowledgement signal to the master storage system 10 over the first mirroring link 72. In accordance with some embodiments of the present invention, upon receiving the acknowledgment notice from the primary slave system 20, the master storage system 10 may acknowledge the transaction to the client(s) 52. Thus, in accordance with this embodiment of the present invention, only after the primary slave system 20 has completed the write transaction and has acknowledged it to system 10 will the master storage system 10 proceed to acknowledge the transaction to host 52.

In accordance with some embodiments of the present invention, the master storage system 10 may be further connected to a secondary slave system 30 through a second mirroring link 75. The secondary slave system 30 may include a secondary mirror server 32. The secondary mirror server 32 may be adapted to store data arriving from the master storage system 10 in a manner to provide backup for data which is stored or which is to be stored in the primary data server 12.

In accordance with some embodiments of the present invention, the master storage system 10 and the secondary slave system 30 may be configured to asynchronously mirror data that is stored or that is to be stored in the primary data server 12 in the secondary mirror server 32, such that the latency associated with the process of mirroring data that is stored or that is to be stored in the primary data server 12 on the secondary mirror server 32 is substantially small. Those of ordinary skill in the art may appreciate that when using common asynchronous remote mirroring techniques some data gaps may exist between the backup data stored in the mirror server and the data in the primary server, meaning that the mirror server may not have stored all the transactions which were acknowledged by the master storage system. However, in accordance with common asynchronous techniques, the backup data in the mirror server is often at least "coherent" with the data in the primary server, meaning, for example, that the backup data in the mirror server, albeit possibly incomplete, maintains, at any point in time, the order by which the transactions were received by the primary data server.

Various asynchronous data mirroring techniques are known in the art. The present invention is not limited to the use of any one particular asynchronous data mirroring technique. Rather, in accordance with some embodiments of the present invention, any asynchronous data mirroring technique presently known or yet to be devised in the future may be used to mirror the data stored in the primary data server 12 on the secondary mirror server 32, for example.

For illustration purposes, a description of one non-limiting example of a general asynchronous data mirroring technique which may be used in accordance with some embodiments of the present invention is provided herein. In accordance with one exemplary embodiment of the present invention, the master storage system 10 may receive a write request from a client 52. Upon receipt of the data, the master storage system 10 may place the data in a cache memory associated with the master storage system 10 (not shown). Next, the master storage system 10 may simultaneously forward the data to the primary data server 12 for storage and to the secondary slave system 30 over the second mirroring link 75 for mirroring. When the data arrives at the secondary slave system 30 the data may be stored in the secondary mirror server 32. In accordance with some embodiments of the present invention, the primary storage system 10 may not require an acknowledgement from the secondary slave system 30 prior to acknowledging the transaction to the clients 52. In other words, the secondary slave system's 30 acknowledgement may not be a requisitory condition for acknowledging the transaction vis-à-vis the client 52. In accordance with some embodiments of the present invention, the secondary slave server 30 may be configured to acknowledge the transaction to the master storage system 10 after the transaction has been received and stored in the secondary slave system 30.

In accordance with an alternative embodiment of the present invention, the storage of the incoming data in the master storage system 10 and both the synchronous mirroring of the incoming data on the primary slave system 20 and the asynchronous mirroring of the data on the secondary slave system 30 may be initiated simultaneously. In accordance with this alternative embodiment of the present invention, upon receiving the incoming data from the clients 52, the master storage system 10 may simultaneously forward the data to the primary data server 12 for storage and to the primary and secondary slave systems 20 and 30 for mirroring. In accordance with some embodiments of the present invention, the primary storage system 10 may not require an acknowledgement from the secondary slave system 30 prior to acknowledging the transaction to the clients 52. It should be noted, that in accordance with this embodiment of the present invention, at certain periods of time, the secondary slave system 30 may store some backup data which, for some reason, had not yet been stored in the primary slave system 20, and therefore, was not acknowledged by the master storage system 10 vis-à-vis the clients 52.

In accordance with some embodiments of the present invention, for each incoming request, one or more events associated with the synchronization of the incoming request in the slave systems (e.g., the primary and secondary slave systems 20 and 30) may be recorded. In accordance with further embodiments of the present invention, one or more events associated with the servicing of the request by the master storage system 10 may also be similarly recorded. In accordance with some embodiments of the present invention, the synchronization and/or servicing events may be recorded in a synchronization log.

The synchronization log may be implemented in any suitable storage medium capable of storing the synchronization and/or servicing records. In accordance with some embodiments of the present invention the master storage system 10 may be associated (e.g., in communication) with the synchronization log, and the synchronization storage medium used for storing the synchronization long may be physically located outside the primary storage system 10. In accordance with some embodiments of the present invention, the master storage system 10 may provide the synchronization log with data relating to the records to be stored in the synchronization log.

In accordance with further embodiments of the present invention, each of the primary and secondary slave systems 20 and 30 may also be capable to communicate with the synchronization log. In accordance with one embodiment of the present invention the master storage system 10 the slave system(s) (e.g. the primary and/or the secondary slave systems 20 and 30) may be configured to routinely communicate with the synchronization log when operating under normal operating conditions. Based on the records stored in the synchronization log, the slave system(s) and/or the master storage system 10 may monitor the synchronization process vis-à-vis each of the slave systems. Thus, the master storage system 10 and the slave system(s) may collect data regarding the synchronization process and/or detect errors in the synchronization process. In accordance with some embodiments of the present invention, the primary storage system and/or the slave system(s) may adapt the synchronization process or the servicing process (vis-à-vis the clients 52) in accordance with the data stored in the synchronization log, or may generate resynchronize requests to compensate for failed synchronization attempts. For example, if the synchronization records indicate that a certain request which, in accordance with the records, was transmitted for synchronization to a certain slave system(s) but is not currently stored for some reason in that slave system, a retransmit request may be generated to indicate to the primary storage system 10 that this particular request was not successfully synchronized on the slave system(s) and the synchronization process should be repeated for this request.

In accordance with some embodiments of the present invention, one or more timestamps may be generated to record the time of occurrence of a certain event which is associated with the synchronization of an incoming request or with the servicing of the incoming request. In accordance with one embodiment of the present invention, a timestamp may be generated to record the time of occurrence of at least each of the following events: the forwarding of an incoming request to the primary data server 12 for storage; the transmission of mirror data associated with the incoming request to the primary slave system 20 for mirroring; and the transmission of mirror data associated with the incoming request to the secondary slave system 30 for mirroring. In accordance with some embodiments of the present invention, each of the timestamps may be stored in the synchronization log. In accordance with further embodiments of the present invention, each timestamp record within the synchronization log may be associated with a specific event to which the timestamp relates. The timestamp record may be associated with further parameters associated with the synchronization processes or with the servicing of the requests. In accordance with some embodiments of the present invention, the synchronization log may be configured to store only a certain number of most recent timestamps and may continuously replace the oldest timestamps with newly received timestamps.

In accordance with some embodiments of the present invention, in the event that the master storage server 10 becomes unable to service requests from the clients 52, for example, as a result of some critical malfunction at the master storage system 10, a first breakdown state may be triggered or initiated. In accordance with some embodiments of the present invention, any malfunction which may prevent the master storage system 10 and/or the primary data server 12 to operate regularly (e.g., service transactions arriving from the clients) may cause the first breakdown state to be initiated, including but not limited to physical damage, power failure, accidental or intentional system shutdown, a virus in the system or a bug. In accordance with further embodiments of the present invention, the first breakdown state may be initiated when either the master storage system 10 and/or any of the slave/backup systems 20 and 30 indicate a malfunction at the master storage system 10.

In accordance with some embodiments of the present invention, the first breakdown state may be triggered when the quality of service provided by the master storage system 10 vis-à-vis the clients 52 falls below a predetermined threshold. In accordance with further embodiments of the present invention, the first breakdown state may be initiated when it is determined that a substantial portion of the data stored in the primary data server 12 is lost or is rendered unusable. In accordance with further embodiments of the present invention, the first breakdown state may be initiated when it is indicated that a substantially massive portion of the data which had been stored in the primary server 12 is lost or is rendered unusable.

In accordance with yet further embodiments of the present invention, once it is determined that the first breakdown state should be triggered, one or more of the master storage system 10, the primary slave system 20 and the secondary slave system 30 may switch to a configuration associated with the first breakdown state. In accordance with some embodiments of the present invention, the configuration associated with the first breakdown state may be preconfigured in each of the master storage system 10, the primary slave system 20 and the secondary slave system 30 prior to the triggering of the first breakdown state. In accordance with some embodiments of the present invention, the configuration associated with the first breakdown state may be maintained in a non-active mode until it is determined that the first breakdown state should be initiated.

In accordance with some embodiment of the present invention, once the first breakdown state is initiated, the slave systems may be configured to determine which of the slave systems is to be used to communicate with the client's 52 which were associated with the master storage system 10 and to service the requests arriving form the clients. In accordance with the embodiment shown in FIG. 1, either the primary or the secondary slave system 20 and 30 may be selected to replace the master storage system 10 and to begin servicing requests arriving from the clients 52.

In accordance with some embodiments of the present invention, in addition, either simultaneously, before or after determining which slave system should take over the communication with the clients 52, the slave systems (e.g., the primary and secondary slave systems 20 and 30) may determine which data backup segments may be missing from each of the slave systems and should be exchange to complete the backup data on each of the slave systems. In accordance with some embodiments of the present invention the slave systems may also be configured to select between a unidirectional synchronization and bidirectional exchange of backup data to complete the backup data in each of the slave systems.

In accordance with some embodiments of the present invention, once the first breakdown state is initiated, the synchronization log may be consulted to determine which slave system should be used to replace the master storage system 10 and to begin servicing requests arriving from the clients 52. In accordance with some embodiments of the present invention, the slave system that is determined to have a more complete or coherent copy, for example, of the backup data may be selected to replace the master storage system 10. However, it should be noted that other criteria may also be used to determine which slave system should be used to replace the master storage system and to begin servicing requests from the clients 52.

In accordance with some embodiments of the present invention, the synchronization log may also be consulted to determine which data backup segments may be missing from each of the slave systems. Based on the information in the synchronization log, the slave systems may be configured to determine which data segments should be exchange to complete the backup data on each of the slave systems. In accordance with some embodiments of the present invention, based on the information stored in the synchronization log, the slave systems may to select between a unidirectional synchronization and bidirectional exchange of backup data to complete the backup data in each of the slave systems. In accordance with one embodiment of the present invention, unidirectional synchronization may be selected when it is determined that one of the slave systems has a substantially complete copy of all the backup data which was transmitted by the master storage system 10 substantially immediately before it broke-down, while bidirectional synchronization may be selected when both the slave systems have substantial data gaps and each slave system may obtain some of the missing data from the other slave system.

Provided below is a description of one exemplary embodiment of the present invention which is illustrated in FIG. 1, wherein the primary slave system 20 is selected to replace the master storage system 10 and to begin servicing requests arriving from the clients 52. It should be noted that this description is exemplary in nature and does not limit the scope of the invention.

In accordance with some embodiments of the present invention, as part of the first breakdown state, the primary slave system 20 may be connected with any of the clients 52 associated with the primary server 10. In accordance with some embodiments of the present invention, a contingency communication link(s) 76 may be activated to connect the primary slave system 20 and any of the clients 52 associated with the primary server 10. The contingency communication link(s) 76 may connect the primary slave system 20 with the clients 52 either directly or through a network.

In accordance with further embodiments of the present invention, the contingency communication link 76 may be active during normal operation (when the master storage system 10 and both the slave systems 20, 30 are functioning and operating normally), and may be used to transfer various metadata between the primary slave system 20 the clients 52. In accordance with yet further embodiments of the present invention, during normal operation, the contingency communication link 76 may also be used to transfer service requests generated by the clients 52 associated with the master storage system 10 to the primary slave system 20. For example, if, for some reason, the communication link 74 is substantially busy, some client's 52 requests (for example, read requests) may be directed to the primary slave system 20 for servicing, thereby alleviating some of the load on the communication link 74. It would be appreciated that since the primary slave system 20 is synchronously mirrored with the master storage system 10, the backup data stored in the primary slave system 20 may be substantially identical to the data stored in the master storage system 10, thereby enabling the primary slave system 20 to service some of the requests, for example, read requests, which may be generated by the clients 52.

In accordance with some embodiments of the present invention, as part of the first breakdown state, the primary slave system 20 may be reconfigured to service I/O requests generated by the clients 52. In layman terms, as part of the first breakdown state, the primary slave system 20 may be reconfigured, such that the primary slave system 20 is capable of replacing the master storage system 10 as the primary storage medium and as the interface with which the clients 52 are communicating.

Those of ordinary skill in the art may appreciate that in the optimal case, at the instant of the breakdown of the master storage system 10, each of the primary slave system 20 and the secondary slave system 30 include a copy of substantially all the relevant data that was stored in the master storage system 10 at the instant of breakdown. However, in some cases it is possible that some transactions which had already been received by the master storage system and forwarded for servicing (possibly even stored in the primary data server 12) have yet to be received in the primary slave system 20 and/or in the secondary slave system 30.

Provided below is a description of a scenario in which it may be determined to utilize a bidirectional synchronization process in-between the slave systems and another scenario in which it may be determined to utilize a unidirectional synchronization process between the primary slave system 20 and the secondary slave system 30. It should be noted that these descriptions are exemplary in nature and does not limit the scope of the invention.

In accordance with some embodiments of the present invention, in case that the master storage system 10 is simultaneously running the synchronous mirroring process and the asynchronous mirroring process, it may be possible that the secondary slave system 30 (which is implementing the asynchronous mirroring process in cooperation with the primary storage system 10) may include some backup data segments which, for some reason (e.g. slow connection between the master storage system 10 and the primary slave system 20), have yet to be stored in the primary slave system 20. In this case, as discussed above, a bidirectional synchronization process may be initiated to resolve or reconcile any data gaps between the primary and secondary slave systems 20 and 30 and vice-versa.

However, In accordance with some embodiments of the present invention, in case that the master storage system 10 is configured to run the asynchronous mirroring process vis-à-vis the secondary slave system 30 only after receiving an acknowledgment from the primary slave system 20, some of the backup data which is stored in the primary slave system 20 may be missing from the secondary slave system 30 at the instant of the breakdown of the master slave system 10. In this case, as discussed above, a unidirectional synchronization process may be initiated to resolve any data gaps which may exist between the primary slave system 20 and the secondary slave systems 30. It should be noted that in accordance with yet further embodiments of the present invention, in addition or in alternative to the data gap completion processes discussed above, in case that there is some synchronization gap between the master storage system 10 and the primary and/or secondary slave systems 20 and 30, the gap may be resolved using any present or future techniques known in the art.

In accordance with some embodiments of the present invention, the first breakdown state may further include connecting the primary slave system 20 with the secondary slave system 30. In accordance with some embodiments of the present invention, a contingency mirroring link 78 may be activated to become a mirroring link connecting the primary slave system 20 and the secondary slave system 30. However, in accordance with further embodiments of the present invention, the contingency mirroring link 78 may be active during normal operation conditions (when the master storage system 10 and both the slave systems 20 and 30 are functioning and operating normally), and may be used to transfer various data and/or metadata between the primary and secondary slave systems 20 and 30.

For example, in accordance with some embodiments of the present invention, during normal operation conditions the primary and secondary slave systems 20 and 30 may periodically communicate with one another. In one embodiment of the present invention, the primary slave system 20 may update the secondary slave system 30 with data relating to the backup data which is stored in the primary slave system 20 and vice-versa. For example, the primary slave system 20 may periodically send to the secondary slave system 30 data relating to the most recent backup data which had been stored in the primary slave system 20. The primary and secondary slave systems 20 and 30 may periodically compare the backup data stored in each of the systems, to determine which system has the most updated copy of backup data. In accordance with further embodiments of the present invention, the primary and secondary slave systems 20 and 30 may interchange, during normal operation conditions, workload parameters associated with the availability of the various resources associated with each of the primary and secondary slave systems 20 and 30. In accordance with yet further embodiments of the present invention, the primary and secondary slave systems 20 and 30 may also share the workload parameters with the clients 52, and the clients 52 may use the workload data to determine with which slave system to communicate. As discussed above, the clients 52 may communicate directly with one or both slave systems 20 and 30 in case that the communication link with the master storage system 10 is too busy (and therefore provides only substantially slow communication, for example) or in case that the master storage system 10 has broken down.

In accordance with some embodiments of the present invention, as part of the first breakdown state, the primary and the secondary slave systems 20 and 30 may be synchronized with one another. In accordance with some embodiments of the present invention, if prior to the first breakdown state being initiated, the master storage system 10 was running the synchronous and asynchronous mirroring processes substantially simultaneously, a bidirectional synchronization process may be initiated to resolve any data gaps which may exist between the primary and secondary slave systems 20 and 30 and vice-versa.

In accordance with some embodiments of the present invention, the synchronization log may be consulted to determine whether there are any data gaps between the data that is stored in the primary slave system 20 and that which is stored in the secondary slave system 30 and vice-versa. In accordance with some embodiments of the present invention, once it is determined which backup data segments each slave system may obtain from the other slave system, a bidirectional synchronization process may be initiated to resolve the data gaps. In accordance with further embodiments of the present invention, no check-up process may be necessary as part of the bidirectional synchronization of the primary and secondary slave systems 20 and 30, and a certain estimated synchronization gap may be assumed. The assumed synchronization gap may be determined based upon some of the data stored in the synchronization log, as well as additional data, for example. In accordance with some embodiments of the present invention, the estimated gap may be a function of and may be affected by various system parameters. In accordance with some embodiments of the present invention, the estimated synchronization gap may be provided in terms of a number of most recent transactions to be synchronized with the primary mirror server 22, or in terms of an amount of time to be synchronized with the primary mirror server 22.

In accordance with further embodiments of the present invention, if however, the master storage 10 system was configured to run the asynchronous mirroring process vis-à-vis the secondary slave system 30 only after receiving an acknowledgment from the primary slave system 20, then, a unidirectional synchronization process, wherein the secondary slave system 30 is synchronized with the primary slave system 20, may be sufficient, as part of the first breakdown state. In accordance with some embodiments of the present invention, the secondary slave system 30 may be checked to determine whether there are any data gaps between the data that is stored in the primary slave system 20 and that which is stored in the secondary slave system 30. In accordance with some embodiments of the present invention, once the data gaps are identified a unidirectional synchronization process (from the primary slave system 20 to the secondary slave system 30) may be initiated to resolve the data gaps. In accordance with further embodiments of the present invention, no check-up process may be necessary as part of the unidirectional synchronization of the secondary slave systems 30 and a certain estimated synchronization gap may be assumed. In accordance with some embodiments of the present invention, the estimated gap may be a function of and may be affected by various system parameters. In accordance with some embodiments of the present invention, the estimated synchronization gap may be provided in terms of a number of most recent transactions to be synchronized with the secondary mirror server 32 and/or with the primary mirror server 22, or in terms of an amount of time to be synchronized with the secondary mirror server 32.

In accordance with some embodiments of the present invention, once the primary and secondary slave systems 20 and 30 are reinitialized and the contingency mirroring link 78 is activated, a synchronous mirroring procedure may be established between the primary slave system 20 and the secondary slave system 30, wherein the clients' 52 requests received by the primary slave system 20 are synchronously mirrored in the secondary slave system 30. Once the synchronous mirroring procedure is in place, the primary slave system 20 may replace the master storage system 10 and the secondary slave system 30 may replace the primary slave system 20.

In accordance with some embodiments of the present invention, in the event that the primary slave system 20 becomes unable to process and/or store incoming synchronization requests and/or service requests from clients (in case the first slave system is responsible for such communication with clients) a second breakdown state may be initiated. In accordance with further embodiments of the present invention, the second breakdown state may be initiated when either the master storage system 10 and/or any of the slave storage systems 20 and 30 indicate a breakdown, such as a critical malfunction for example, at the primary slave system 20.

In accordance with further embodiments of the present invention, the second breakdown state may be initiated when it is determined that a substantial portion of the data stored in the primary mirror server 22 is lost or is rendered unusable. In accordance with further embodiments of the present invention, the second breakdown state may be initiated when it is determined that a massive portion of the data which had been stored in the primary mirror server 22 is lost or is rendered unusable.

In accordance with some embodiments of the present invention, once it is determined that the second breakdown state should be triggered, one or more of the master storage system 10, the primary slave system 20 and the secondary slave system 30 may switch to a configuration associated with the second breakdown state. In accordance with some embodiments of the present invention, the configuration associated with the second may be preconfigured in each of the master storage system 10, the primary slave system 20 and the secondary slave system 30 prior to the triggering of the first breakdown state. In accordance with some embodiments of the present invention, the configuration associated with the second breakdown state may be maintained in a non-active mode until it is determined that the second breakdown state should be initiated.

In accordance with some embodiments of the present invention, as part of the second breakdown state, the secondary slave system 30 may be reinitialized. In accordance with further embodiments of the present invention, as part of the reinitialization process, the secondary slave system 30 may be checked to determine whether there are any gaps between the data that is stored in the master storage system 10 and the data that is stored in the secondary slave system 30 and to identify these data gaps. In accordance with an alternative embodiment of the present invention, the synchronization log may be checked to determine whether there are any backup data gaps between the master storage system 10 and the secondary slave system 30 and to identify these data gaps. In accordance with yet further embodiments of the present invention, no check-up process may be necessary as part of the reinitialization of the secondary slave system 30, and a certain estimated synchronization gap may be assumed. The estimated synchronization gap may correspond to the estimated gap between the data that is stored in the master storage system 10 and the data that is stored in the secondary slave system 30. In accordance with some embodiments of the present invention, the estimated gap is a function of and may be affected by various system parameters. In accordance with some embodiments of the present invention, the estimated synchronization gap is provided in terms of a number of most recent transactions to be synchronized with the primary data server 12, or in terms of an amount of time to be synchronized with the primary data server 12.

In accordance with some embodiments of the present invention, once the secondary slave system 30 is reinitialized, a synchronous mirroring procedure may be established between the master storage system 10 and the secondary slave system 30, wherein the clients' 52 requests received by the master storage system 10 are synchronously mirrored in the secondary salve system 30. Once the synchronous mirroring procedure is in place, the secondary slave system 30 may replace the primary slave system 20.

In accordance with some embodiments of the present invention, in the event that the secondary slave system 30 becomes unable to process and/or store incoming synchronization requests, a third breakdown state may be initiated. In accordance with further embodiments of the present invention, the third breakdown state may be initiated when either the master storage system 10 and/or any of the slave storage systems 20 and 30 indicate a breakdown, such as a critical malfunction for example, at the secondary slave system 30.

Reference in now made to FIG. 2, which is a block diagram illustration of one possible configuration of a master storage system, in accordance with some embodiments of the present invention. According to some embodiments of the present invention, a master storage system 10 may include a client communication module 210. The client communication module 210 may be adapted to manage incoming and/or outgoing communications from or to the master storage system 10 to or from one or more clients 52 associated with the master storage system 10, and may be connected to one or more communication links 74 which may be used to connect the master storage system 10 and the clients 52.

In accordance with some embodiments of the present invention, the master storage system 10 may also include a cache memory device 220. The cache memory device may be adapted to store incoming and/or outgoing data before the data is forwarded to its final destination. The cache memory 220 may also be used as a buffer, and may perform other functions as is well-known in the art. For example, the cache 220 may store incoming write requests which had been generated by one of the clients 52 associated with the master storage system 10, and which will eventually be stored in a substantially permanent storage medium associated with the master storage system 10. In accordance with some embodiments of the present invention the master storage system 10 may also include a system controller 250. The system controller 250 may be adapted control one or more function of one or more elements of the master storage system 10 and may include any necessary components necessary to perform such functions, including but not limited to, a CPU unit and RAM or any other suitable memory storage devices.

In accordance with some embodiments of the present invention, the master storage system may include a primary data server 12. The primary data server 12 may be adapted to substantially permanently store data in the master storage system 10, including but not limited to write requests and other data transactions arriving from one or more of the clients 52 associated with the master storage system 10.

In accordance with some embodiments of the present invention, the master storage system 10 may further include at least a first primary mirroring module 230 and a second primary mirroring module 240. The first primary mirroring module 230 may be adapted to establish and maintain a first mirroring link 72 between the master storage system 10 and a primary slave/backup system 20. The second primary mirroring module 240 may be adapted to establish and maintain a second mirroring link 75 between the master storage system 10 and a secondary slave/backup system 30.

In accordance with some embodiments of the present invention, the first primary mirroring module 230 may be adapted to establish and maintain a synchronous mirroring process between the master storage system 10 and the primary slave system 20. In accordance with some embodiments of the present invention, the first primary mirroring module 230, either alone or in combination with the system controller 250 may be configured to determine which data segment(s) that are stored in the primary data server 12 or that are to be stored in the primary data server 12 (and are currently temporarily stored in the cache 220, for example) are to be synchronously mirrored in the primary slave system 20.

In accordance with one embodiment of the present invention, the first primary mirroring module 230 may not be required to decide which data segment(s) should be mirrored in the primary slave system 20, and either a certain kind or portion of the transactions with the clients 52 or some other specific group of transactions with the clients 52 may be determined in advance to be automatically forwarded to the first primary mirroring module 230 for mirroring in the primary slave system 20. In accordance with further embodiments of the present invention, some other element associated with the master storage system 10 may be responsible for deciding which data segment(s) are to be mirrored in the primary slave system 20. For example, in accordance with one embodiment of the present invention, the first primary mirroring module 230 may be configured such that every write request, for example, arriving from any of the clients 52 associated with the master storage system 10 is to be mirrored in the primary slave system 20. In this exemplary embodiment, the first primary mirroring module 230 may be responsible for verifying all write requests are indeed being forwarded from the cache 220 to the first primary mirroring module 230, and are being transmitted to the primary slave system 20 for mirroring.

In according with some embodiments of the present invention, once the first primary mirroring module 230 determines which data segment(s) are to be mirrored in the primary slave system 20, the first primary mirroring module 230 may prepare the data for synchronous mirroring. For example, as part of the preparation for synchronous mirroring the first primary mirroring module 230 may add metadata (including timestamps, for example) to the data to be mirrored. In accordance with some embodiments, once the data is ready for synchronous mirroring the first primary mirroring module 230 may be adapted to transmit the data to be mirrored to the primary slave system 20.

In accordance with some embodiments of the present invention, the first primary mirroring module 230 may be configured to anticipate an acknowledgement from the primary slave system 20 indicating that the data which was transmitted to the primary slave system 20 had arrived at the primary slave system 20 and had been processed and stored. In accordance with some embodiments of the present invention, the first primary mirroring module 230 may be configured to track the incoming acknowledgments arriving from the primary slave system 20 and may be adapted to associate the incoming acknowledgments with the specific data segment(s) which were transmitted to the primary slave system 20 for mirroring. In accordance with some embodiments of the present invention, in case that a certain period of time had passed and no acknowledgement for a certain data segment has yet to have been received, the first primary mirroring module 230 may issue a mirroring failure notice for that data segment and may reattempt to mirror the data segment on the primary slave system 20, as described above.

In accordance with some embodiments of the present invention, once an acknowledgment has been received at the first primary mirroring module 230 for a certain data segment(s), the first primary mirroring module 230 may be configured to indicate to the system controller 250 that that data segment(s) is successfully mirrored in the primary slave system 20. In accordance with some embodiments of the present invention, once the system controller 250 receives notice from the first primary mirroring module 230 that a certain data segment has been successfully mirrored in the primary slave system 20, the system controller 250 may be configured to instruct the client communication module 210 to transmit an acknowledgment notification to the client 52 associated with the transaction, thereby acknowledging the transaction.

In accordance with some embodiments of the present invention, the second primary mirroring module 240 may be adapted to establish and maintain an asynchronous mirroring process between the master storage system 10 and the secondary slave system 30. In accordance with some embodiments of the present invention, the second primary mirroring module 240, either alone or in combination with the system controller 250, may be configured to determine which data segment(s) that are stored in the primary data server 12 or that are to be stored in the primary data server 12 (and are currently temporarily stored in the cache 220, for example) are to be asynchronously mirrored in the secondary slave system 30.

In accordance with one embodiment of the present invention, the second primary mirroring module 240 may not be required to decide which data segment(s) should be mirrored in the secondary slave system 30, and either certain predefined transactions with the clients 52 are determined in advance to be automatically forwarded to the second primary mirroring module 240 for mirroring in the secondary slave system 30, or some other element in the master storage system 10 may be responsible for deciding which segment(s) are to be mirrored in the secondary slave system 30. For example, in accordance with one embodiment of the present invention, the second primary mirroring module 240 may be configured such that every write request, for example, arriving from any of the clients 52 associated with the master storage system 10 is to be mirrored in the secondary slave system 30. In this exemplary embodiment the second primary mirroring module 240 may be responsible for determining that the write requests are indeed being forwarded and are being transmitted to the secondary slave system 30 for mirroring.

In according with some embodiments of the present invention, once the second primary mirroring module 240 determines which data segment(s) are to be mirrored in the secondary slave system 30, the second primary mirroring module 240 may prepare the data for asynchronous mirroring (including timestamps for example). In accordance with some embodiments, once the data is ready for asynchronous mirroring the second primary mirroring module 240 may be adapted to transmit the data to be mirrored to the secondary slave system 30.

In accordance with some embodiments of the present invention, once the data is transmitted by the second primary mirroring module 240, the second primary mirroring module 240 may not be required to anticipate any response from the secondary slave system 30, and may signal or acknowledge to the system controller 250, for example, that the data has been mirrored in the secondary slave system 30.

In accordance with some embodiments of the present invention, an incoming transaction may be simultaneously forwarded to the primary storage server 12 for storage and to the primary and secondary slave systems 20 and 30, through the first and second primary mirroring module 230 and 240, for backup. In accordance with further embodiments of the present invention, an incoming transaction may be first simultaneously forwarded to the primary storage server 12 and to the primary slave system 20, and only after an acknowledgement is received from the first primary mirroring module 230 that the data had been received and stored in the primary slave system 20, the data is forwarded to the second primary mirroring module 240 to be asynchronously mirrored in the secondary slave system 20. In accordance with yet further embodiments of the present invention, an incoming transaction may be first forwarded to the primary slave system 20, and only after an acknowledgement is received from the first primary mirroring module 230 the data is forwarded to the primary storage server 12, and either simultaneously or following an acknowledgement from the primary storage server 12, to the second primary mirroring module 240 to be asynchronously mirrored in the secondary slave system 20.

In accordance with some embodiments of the present invention, the master storage system 10 may monitor the operation of the primary slave system 20. In accordance with some embodiments of the present invention the system controller 250 either directly or in cooperation with the first primary mirroring module 230 may routinely, randomly, continuously or periodically verify that the primary slave system 20 is operating and that it is functioning properly. In case that is determined, for some reason or in accordance with predefined criteria, that the primary slave system 20 has ceased to operate or that it is not functioning properly, for example, in case that a certain number of synchronization requests are not acknowledged over a certain period of time, the system controller 250 either directly or in cooperation with the first primary mirroring module 230 may deduce that the primary slave system 20 has broken down and may initiate the second breakdown state discussed above. In another example, the second breakdown state may be deduced when a specific signal indicating that a breakdown has occurred is received from the primary slave system 20. The primary slave system 20 may issue and transmit to the master storage system 10 a signal indicating a breakdown when one or more of the elements associated with the primary slave system 20 are not functioning properly, for example, when the primary mirror server 22 is critically malfunctioned.

In accordance with some embodiments of the present invention, in case that it is determined that the primary slave system 20 has broken down, the system controller 250 either directly or in cooperation with the first primary mirroring module 230 may trigger the second breakdown state which was described above with reference to FIG. 1. In accordance with some embodiments of the present invention, once in the second breakdown state, the primary storage system 10 may initiate a resynchronization process in the secondary slave system 30. In according to some embodiments of the present invention, the system controller 250 or some other element associated with the master storage system 10 may be adapted to signal the secondary slave system 30 to commence the resynchronization process. In accordance with some embodiments of the present invention, the system controller 250 may reconfigure the second primary mirroring module 240. In accordance with some embodiments of the present invention, once reconfigured the second primary mirroring module 240, either independently or in cooperation with the controller 250 may check the secondary slave system 30 to determine whether there are any gaps between the data that is stored in the primary data server 12 and the data that is stored in the secondary mirror server 32. In accordance with further embodiments of the present invention, no check-up may be necessary, and a certain estimated synchronization gap may be assumed. The estimated synchronization gap may correspond to the estimated gap between the data that is stored in the primary data server 12 and the data that is stored in the secondary mirror server 32. In accordance with some embodiments of the present invention, the estimated gap is a function of and may be affected by various system parameters. In accordance with some embodiments of the present invention, the estimated synchronization gap is provided in terms of a number of most recent transactions to be synchronized with the primary data server 12.

In accordance with some embodiments of the present invention, once the secondary slave system 30 is resynchronized, the second primary mirroring module 240 may be reconfigured to synchronously mirror incoming transactions to be stored in the primary data server 12 on the secondary slave system 30. Alternatively, in accordance with further embodiments of the present invention, the second primary mirroring module 240 may already be configured to support synchronous mirroring of incoming transactions to be stored in the primary data server 12 on the secondary slave system 30. In this case, the system controller 250 may only be required to signal the second primary mirroring module 240 to switch to a synchronous mirroring mode.

In accordance with some embodiments of the present invention, when the second breakdown state is implemented, the first primary mirroring module 230 may continue to monitor the first mirroring link 72. If it is determined that the primary slave system 20 has returned to operate and/or function properly, the second breakdown state may be switched off or deactivated, and after resynchronizing the primary slave system 20, the pervious configuration which was implemented prior to the activation of the second breakdown state may be restored.

In accordance with some embodiments of the present invention, when the second breakdown state is triggered, the system controller 250 may chose to instruct the first primary mirroring module 230 to connect to the secondary slave system 30 and to take over the synchronization process vis-à-vis the secondary slave system 30. In this case, after the secondary slave system 30 is resynchronized, the synchronous mirroring process may commence and no reconfiguration of the (first) primary mirroring module may be required. In accordance with some embodiments of the present invention, if the second breakdown state is discontinued and the primary slave system 20 is back to normal operation, communication and synchronization may be reestablished via the second primary mirroring module 240. In this case, the primary slave system 20 may now become the asynchronously mirrored system, and the secondary slave system 30 may remain the synchronously mirrored system. The rules discussed above with reference to the various breakdown states may be adapted to accommodate for this new situation in which the primary and the secondary slave systems 230 and 240 are switched and take each other's role. In an alternative embodiment, in case that the primary slave system 20 is operating properly again, the original configuration may be restored after the primary slave system 20 has been reinitialized.

It should be noted that the above description of the master storage system is exemplary in nature and that the present invention is not limited to the above described configuration and functionality of the master storage system. Rather, in accordance with some embodiments of the present invention, the master storage system may include or may be associated with additional or different elements or with elements having additional or different functionality.

Reference is now made to FIG. 3, which is a block diagram illustration of one possible configuration of a first slave system, in accordance with some embodiments of the present invention. In accordance with some embodiments of the present invention, the primary slave system 20 may include a cache 320 and a system controller 350. In accordance with some embodiments of the present invention, the primary slave system 20 may also include a primary mirror server 22. The primary mirror server 22 may be adapted to substantially permanently store data in the primary slave system 20, including but not limited to, synchronization data received from the master storage system 10. In accordance with some embodiments of the present invention of the present invention, at least a portion of the primary mirror server 22 may be used to mirror the data stored in the primary data server 12 associated with the master storage system 10.

In accordance with some embodiments of the present invention, the primary slave system 20 may include a primary slave mirroring module 330A. In accordance with some embodiments of the present invention, while the system is operating normally, the primary slave mirroring module 330A may participate in the synchronization process vis-à-vis the master storage system 10, for example. For example, in accordance with some embodiments of the present invention incoming mirroring requests arriving from the master storage system 10 may be received at primary slave mirroring module 330A. The primary slave mirroring module 330A may be configured to forward the incoming data to the primary mirror server 22 either directly or after the data had been stored in the cache memory 320. Once the data is stored in the primary mirror server 22, the system controller 350, either alone or in cooperation with the primary slave mirroring module 330A, may generate an acknowledgment signal and may forward the acknowledgement signal to the master storage system 10, for example via the primary slave mirroring module 330A.

In accordance with some embodiments of the present invention, the system controller 350 may routinely, randomly, continuously or periodically monitor incoming transmissions to verify that the master storage system 10 is operating, and that it is functioning properly. In case that is determined for some reason or in accordance with predefined criteria, that the master storage system 10 is broken down or that it is not functioning properly, for example, in case that no synchronization requests are received from the master storage system 10 within a predefined period of time, the system controller 350 may deduce that the master storage system 10 has broken down. In another example, the system controller 250 of the master storage system 10 may detect a certain malfunction or malfunctions in one or more of the elements associated with the master storage system 10, and may produce a specific signal indicating that the master storage system 10 is malfunctioning.

In accordance with some embodiments of the present invention, when it is determined that the master storage system 10 is down or that it is not functioning properly, the first breakdown state which was described above with reference to FIG. 1 may be triggered. In accordance with further embodiments of the present invention, the system controller 350 of the primary slave system 20 may trigger the first breakdown state.

In accordance with some embodiments of the present invention, when the primary slave system 20 is switched to the first breakdown state, the client communication module 310 may be activated. In accordance with some embodiments of the present invention, the client communication module 310 may activate a dormant communication link 76 between the primary slave system 20 and the clients 52 which were associated with the master storage system 10, prior to the initiation of the first breakdown state. However, in accordance with further embodiments of the present invention, the contingency communication link 76 may be active during normal operation (prior to a breakdown situation), and may be used to transfer various metadata between the primary slave system 20 the clients 52.

In accordance with some embodiments of the present invention, the client communication module 310 may be adapted to establish communication with any of the clients 52 previously associated with the master storage system 10 either directly or through a network. In accordance with further embodiments of the present invention, as part of the first breakdown state, one or more of the elements of the primary slave system 20 may be reconfigured to enable the primary slave system 20 to service I/O requests arriving from the clients 52.

In accordance with some embodiments of the present invention, as part of the first breakdown state, the system controller 350 may activate or reconfigure a primary slave contingency mirroring module 330B. In accordance with further embodiments of the present invention, the primary slave contingency mirroring module 330B may be configured or may be reconfigured, such that the primary slave contingency mirroring module 330B, either independently or in cooperation with the secondary slave system 20, is adapted to synchronously mirror data to be stored in the primary mirror server 20 on the secondary mirror server 30. An example of the function of a mirroring module in the synchronous mirroring process has been provided above as part of the description of FIG. 2.

In accordance with some embodiments of the present invention, once active, the primary slave contingency mirroring module 330B may be adapted to establish a contingency mirroring link 78 with the secondary slave system 30. Once the contingency mirroring link 78 between the primary and secondary slave systems 20 and 30 is established, the secondary slave system 30 may undergo a resynchronization process. In accordance with further embodiments of the present invention, in some cases both the primary and the secondary slave systems 20 and 30 may undergo resynchronization. The situations in which a unidirectional synchronization and in which a bidirectional synchronization are required and the processes themselves has been discussed above with reference to FIG. 1.

In accordance with some embodiments of the present invention, once the contingency mirroring link 78 is established, and the secondary slave systems 30 and (if necessary) the primary slave system 20 are updated, the primary slave system 20 may commence a synchronous mirroring process vis-à-vis the secondary slave system 30. Thus, in accordance with some embodiments of the present invention, in case that the first breakdown state is implemented, the primary slave system 20 may substantially replace the master storage system 10 and may communicate with the clients 52, and the secondary slave system 30 may substantially replace the primary slave system 20 by providing a data server that is synchronous mirrored with the data server of the primary slave system 20.

It should be noted that the above description of the primary slave/backup system is exemplary in nature and that the present invention is not limited to the above described configuration and functionality of the primary slave/backup system. Rather, in accordance with some embodiments of the present invention, the primary slave/backup system may include or may be associated with additional or different elements or with elements having additional or different functionality.

Reference is now made to FIG. 4, which is a block diagram illustration of one possible configuration of a secondary slave system, in accordance with some embodiments of the present invention. In accordance with some embodiments of the present invention, the secondary slave system 30 may include a cache 420 and a system controller 450. In accordance with some embodiments of the present invention, the secondary slave system 30 may also include a secondary mirror server 32. The secondary mirror server 32 may be adapted to substantially permanently store data in the secondary slave system 30, including but not limited to, synchronization data received from the master storage system 10. In accordance with some embodiments of the present invention of the present invention, at least a portion of the secondary mirror server 32 may be used to mirror the data stored in the primary data server 12 associated with the master storage system 10.

In accordance with some embodiments of the present invention, the secondary slave system 20 may include a secondary slave mirroring module 430A. In accordance with some embodiments of the present invention, while the system is operating normally, the secondary slave mirroring module 430A may participate in the synchronization process vis-à-vis the master storage system 10, for example. For example, in accordance with some embodiments of the present invention incoming mirroring requests arriving from the master storage system 10 may be received at secondary slave mirroring module 430A. The secondary slave mirroring module 430A may be configured to forward the incoming data to the secondary mirror server 32 either directly or after the data had been stored in the cache memory 420. Once the data is stored in the secondary mirror server 32, the system controller 450, either alone or in cooperation with the secondary slave mirroring module 430A, may generate an acknowledgment signal and may forward the acknowledgement signal to the master storage system 10, for example via the secondary slave mirroring module 430A.

In accordance with some embodiments of the present invention, when it is determined that the master storage system 10 is down or that it is not functioning properly, the first breakdown state which was described above with reference to FIGS. 1 and 3 may be triggered. In accordance with further embodiments of the present invention, the system controller 450 of the secondary slave system 30 may trigger the first breakdown state in the secondary slave system 30, upon receiving a signal that the master storage system 10 is not functioning properly.

In accordance with some embodiments of the present invention, the secondary slave system 30 may be adapted to establish in cooperation with the primary slave system 20 a contingency mirroring link 78. For example, in accordance with some embodiments of the present invention, once the first breakdown state is triggered a secondary slave contingency mirroring module 430B may be activated or reconfigured. The secondary slave contingency mirroring module 430B may activate the contingency mirroring link 78, for example, in cooperation with the primary slave contingency mirroring module 330B.

Once the contingency mirroring link 78 between the primary and secondary slave systems 20 and 30 is established, the secondary slave system 30 in cooperation with the primary slave system 20 may initiate a reconfiguration and resynchronization process, whereby the secondary slave system 30 may be resynchronized with the primary slave 20 and (if necessary) vice-versa, to compensate for any gaps that may exist between the data stored in the primary slave system 20 and the data stored in the secondary slave system 30 and (if necessary) vice-versa. The resynchronization of the secondary slave system 30 and primary slave system 20 has been discussed in greater detail hereinabove.

In accordance with some embodiments of the present invention, once the secondary and/or the primary slave systems 30 and 20 are resynchronized and contingency mirroring link 78 is established, the primary and secondary slave systems 20 and 30 may commence a synchronous mirroring process. In accordance with some embodiments of the present invention, the secondary slave contingency mirroring module 430B may participate in the synchronous mirroring process. The synchronous mirroring process was described in greater detail hereinabove.

In accordance with some embodiments of the present invention, once the synchronous mirroring process between the primary slave system 20 and the secondary slave system 30 is initiated, backup data may be received at the secondary slave system 30 for synchronization. For example, the data may be received at the secondary slave contingency mirroring module 430B. In accordance with some embodiments of the present invention, when a data transaction arrives into the primary slave system 20, the data may be simultaneously forwarded to the primary mirror server 22 (now serving as the primary server) and to the secondary slave system 30. In accordance with some embodiments of the present invention, once the data is stored in the secondary mirror server 32, the system controller 450, for example in cooperation with the secondary slave contingency mirroring module 430B or any other suitable element associated with the secondary slave system 32 may acknowledge the transaction to the primary slave system 20, which in turn may acknowledge the transaction to one or more clients 52 associated with the primary slave system 20.

In accordance with some embodiments of the present invention, when it is determined that the primary slave system 20 is down or that it is not functioning properly, the second breakdown state which was described above with reference to FIGS. 1 and 2 may be triggered. In accordance with further embodiments of the present invention, the system controller 450 of the secondary slave system 30 may trigger the first breakdown state in the secondary slave system 30, upon receiving a signal that the primary slave system 20 is not functioning properly.

In accordance with some embodiments of the present invention, once the second breakdown state is triggered, the system controller 450 may be adapted to launch a resynchronization process, whereby one or more of the elements of the secondary slave system 30 or associated with the secondary slave system 30 may be reconfigured. In accordance with some embodiments of the present invention, as part of the resynchronization process, the secondary slave system 30 may be resynchronized with master storage system 10 to compensate for any gaps that may exist between the data stored in the primary data server 12 and the data stored in the secondary mirror server 32. Those of ordinary skill in the art may appreciate that data gaps between the data stored in the primary data server 12 and the secondary slave server 32 may exist due to the characteristics of the asynchronous mirroring process which may be implemented in the secondary slave system 30.

In accordance with some embodiments of the present invention, once the elements of the secondary slave system 30 are reconfigured, and the secondary mirror server 32 is resynchronized, the master storage system 10 may commence a synchronous mirroring process vis-à-vis the secondary slave system 30. In accordance with some embodiments of the present invention, once the synchronous mirroring process between the master storage system 10 and the second slave system 30 is initiated, backup data may be received in the secondary slave system 30 for synchronization. In accordance with some embodiments of the present invention, after the data to be mirrored has been stored in the secondary mirror server 32, the system controller 450 or any other suitable element associated with the secondary slave system 30 may acknowledge the transaction to the primary slave system 20 and will enable the primary slave system 20 to acknowledge the transactions to the clients 52.

It should be noted that the above description of the second slave system is exemplary in nature and that the present invention is not limited to the above described configuration and functionality of the master storage system. Rather, in accordance with some embodiments of the present invention, the second slave system may include or may be associated with additional or different elements or with elements having additional or different functionality.

Figure 5B:
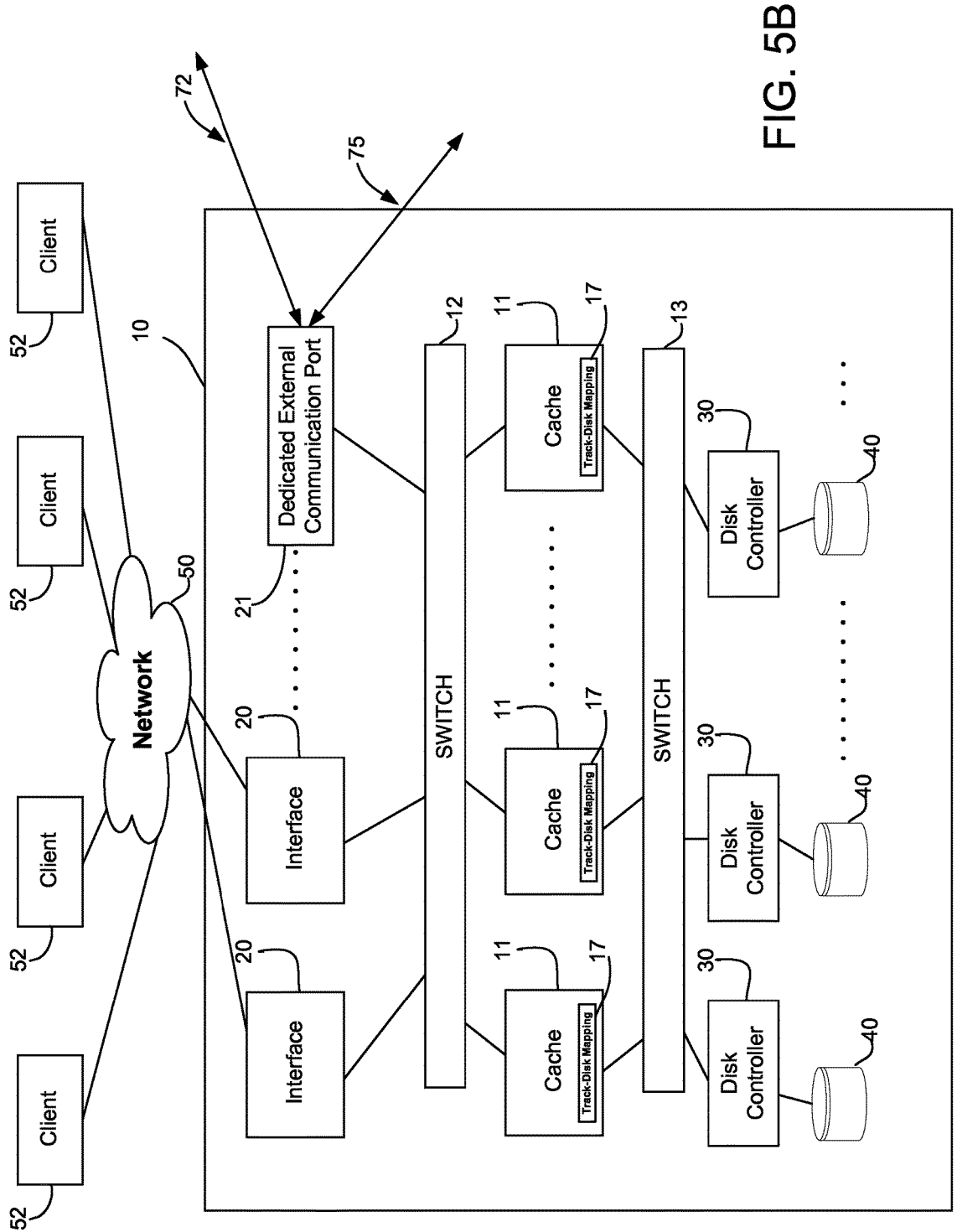
FIG. 5B is a block diagram of an exemplary data storage server/system where a dedicated communication port is an independent module within the system not associated with any existing interface where the system can contain more than one such independent dedicated communication port.

Turning now to FIG. 5A, there is shown a block diagram of an exemplary data storage server/system. The system shown in FIG. 5A may include an interface 20 which either includes or is functionally associated with a dedicated communication port 21 for communicating with one or more external data systems, such as a mirror or back-up system. The interface 20 and dedicated communication port 21 may be part of or otherwise functionally associated with the first primary mirroring module 230, the second primary mirroring module 240, or both primary mirroring modules shown in FIG. 2. The dedicated communication module 21 may be configured during system initialization and may remain a primary port for external communication for one or more components of the data system (e.g. for the mirroring modules). Alternatively, turning to FIG. 5B, the dedicated communication port can be an independent module within the system not associated with any existing interface moreover the system may contain more than one such independent dedicated communication port.

Figure 6A:
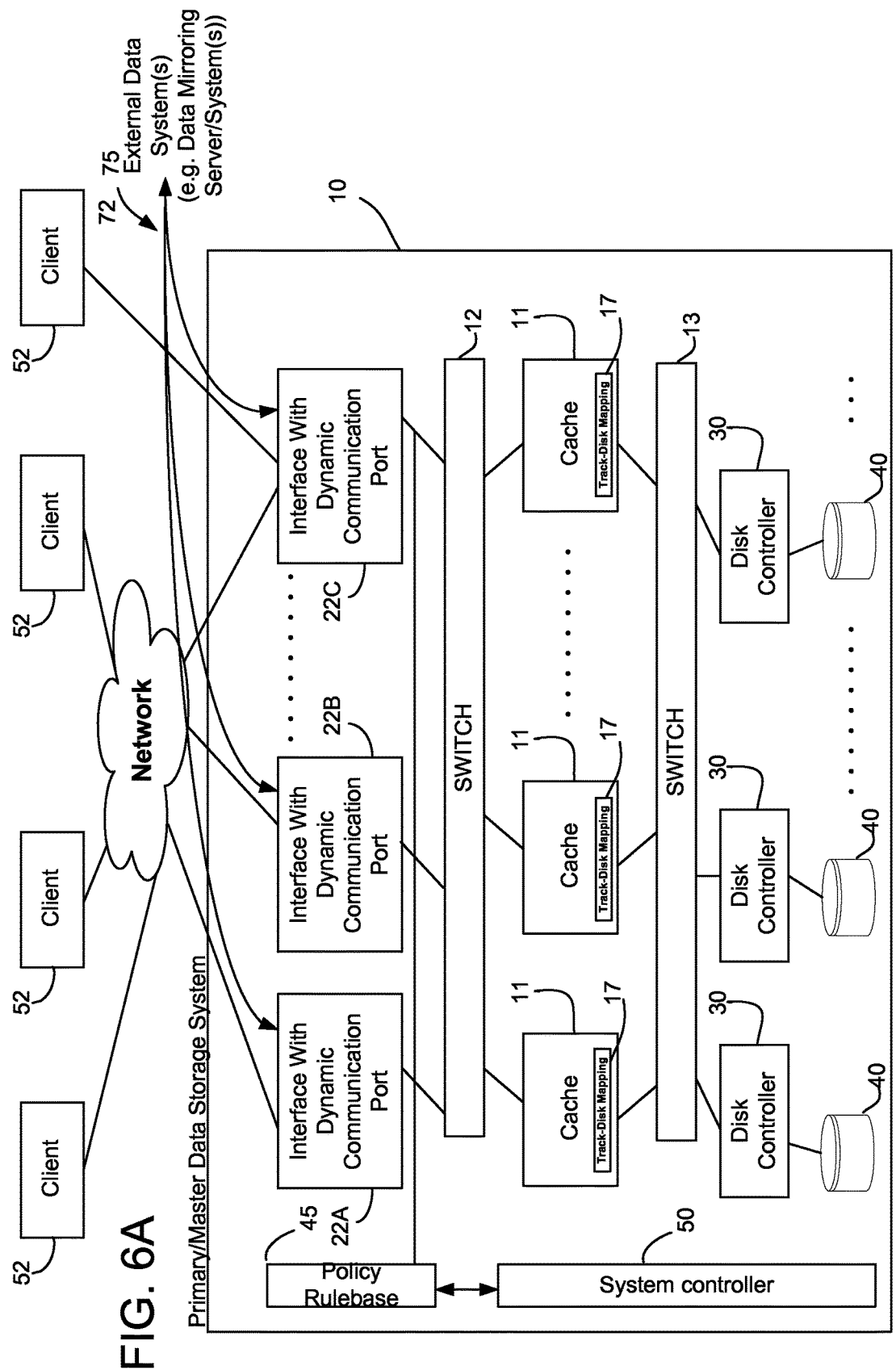
FIG. 6A is a block diagram of an exemplary master/primary data storage server/system where each of multiple interfaces includes a communication port for communicating with one or more external (e.g. mirror/back-up) servers/systems, and wherein policy such as which interface communicates with which mirror/back-up servers/systems is dynamically adjusted during operation according to policy set by the system controller.

Turning now to FIG. 6A, there is shown a block diagram of an exemplary data storage system including multiple interfaces with integral non-dedicated communication ports 22A through 22C. According to the embodiment of the system shown in FIG. 6A, any one or set of interfaces with non-dedicated communication ports 22 may be designated and or configured to communicate with one or more mirror/back-up servers/systems, or one or more data clients, and wherein which interface communicates with which mirror/back-up servers/systems or is available to serve data clients may either be defined at setup or may dynamically be adjusted during operation. Adjustments of which interface communicates with which external data mirroring server or other data system may be set by the system controller 50 based on policy set by the policy module 45 and system performance parameters. Parameters such as bandwidth, latency and processing load may influence the determination of which interface/port combination(s) is used for external communication.

Figure 6B:
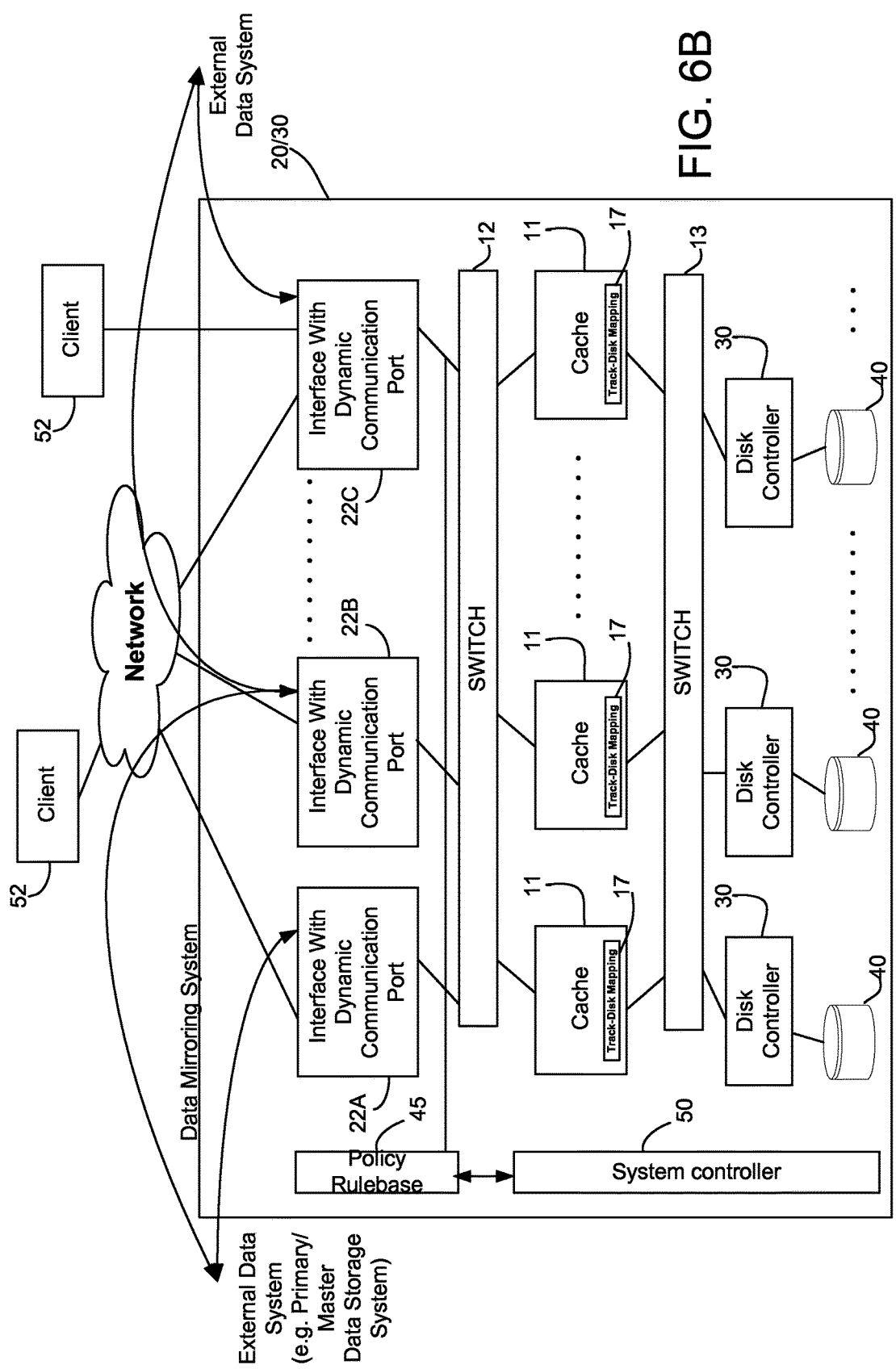
FIG. 6B is a block diagram of an exemplary data storage server/system where each of multiple interfaces includes a communication port for communicating with one or more mirror/back-up servers/systems, and wherein policy such as which interface communicates with which mirror/back-up servers/systems is dynamically adjusted during operation according to policy set by the system controller.

Turning now to FIG. 6B, there is shown a block diagram of an exemplary slave/mirror data storage system including multiple interfaces with integral dynamically-configured communication ports 22A through 22C. According to the embodiment of the system shown in FIG. 6B, any one or set of interfaces with dynamically-configured communication ports 22 may be designated and or configured to communicate with a master storage system/server, one or more mirror/back-up servers/systems, or one or more data clients, and wherein which interface communicates with the master data server/system, which mirror/back-up servers/systems or available to service data client may either be defined at setup or may dynamically be adjusted during operation. Adjustments of which interface communicates with which external data mirroring server or other data system may be set by the system controller 50 based on policy set by the policy module 45 and system performance parameters. Parameters such as bandwidth, latency and processing load may influence the determination of which interface/port combination(s) is used for external communication.

Each data storage server/system may include a policy rulebase, which may control which clients are to be allowed to connect to which communication port, and what logical units they may be able to access through said port. The mapping of logical units to ports may be done transparently to the data clients.

Each interface with integral dynamically-configured communication port may include a task queue for the logical units that may be accessed through it. The task queue may be used by the system controller and the policy rulebase to assign communication ports to data clients.

Figure 7:
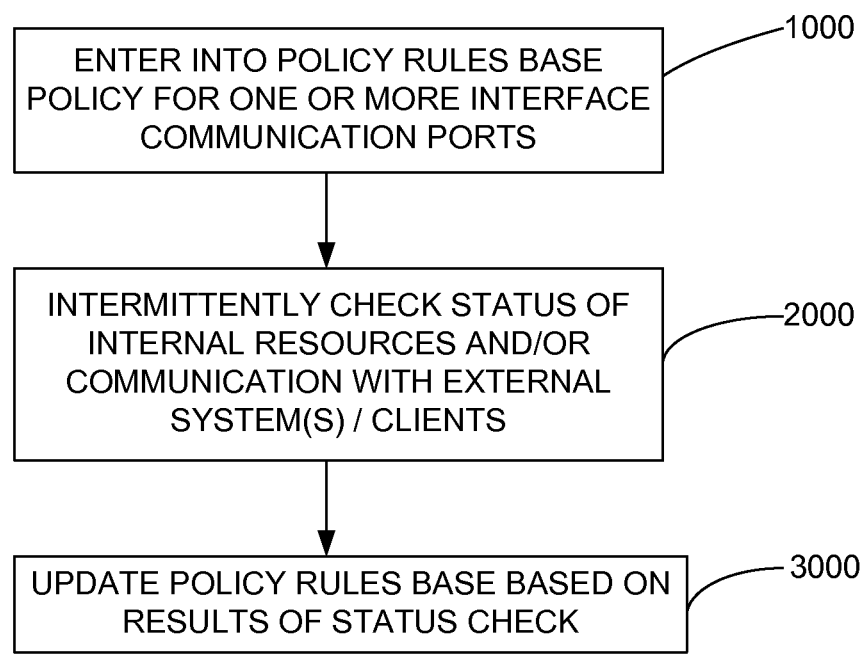
FIG. 7 is a flow chart showing the steps of a method in accordance with some embodiments of the present invention.

A mode of operation of the system according to FIG. 6A may be described in conjunction with FIG. 7, which is a flow chart including the steps of a method in accordance with some embodiments of the present invention. As shown in FIG. 7, one or more of the interfaces including a dynamically configured communication port 22 may be designated for and/or configured by policy to communicate with a specific external data system (step 1000). Once the interface 22 has been configured, either during system initialization or during operation, that interface and its communication port 22 act as a dedicated communication port to the external data system for various system components such a mirroring modules 230 and 240.

During operation of the system, system performance and access policy relating to the designated communication port(s) are monitored (step 2000). In the event it is determined that for some reason communication with a given external data system may be enhanced by changing from one interface with communication port to an alternative interface with communication port (e.g. from 22A to 22C), the system may reassign or re-designate the interface/port 22 to external data system combination.

Each Interface Module 22 may have a unique identifier, which may be an IP address or a World Wide Name (WWN). Each IF is able to identify any other IF available through communication line. The IFs 22 function generally as targets for requests stemming from the clients 52, but for the sake of remote mirroring, they may also function as initiators that send requests to the remote mirror/backup system. This may be true for all IFs in the system and there may be no need to define which IFs in the local and in the remote systems are used for remote mirroring and which are not. Moreover, there may be no need to establish any specific or dedicated communication between the IFs of the local and the remote systems. Rather, it may be enough to specify in the request the IP address or WWN of any of the IFs in the remote, and they will be automatically identified over the network and the connection thus established.

In addition, at any given point in time, the IFs 22 can be defined as being devoted to remote mirroring and the other IFs 22's can be left to communication between the local system and the clients 52. Allocation and reallocation may be done dynamically under the control of a system management module, which management module may estimate several parameters associated with workload in the system as a whole or in parts of it, and together with a policy rulebase make the according changes in a configuration table of the system. The modified table may be broadcasted to all components of the system and the system stats working accordingly. In this way, the IFs can be dynamically modified from dedicated to non-dedicated status according to the needs of the system.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A data storage system configured to be coupled to one or more data clients, said data storage system comprising:
   a primary backup system coupled to said one or more data clients via a first communication link;
   a secondary backup system coupled to said one or more data clients via a second communication link and to the primary backup system; and
   a primary storage system coupled to the primary backup system and to the secondary backup system, the primary storage system comprising one or more servers and at least two interfaces coupled to said one or more servers, wherein:
   each of said at least two interfaces is configured to provide said primary backup system, said secondary backup system, and said one or more data clients with access to said primary data storage system based on a policy rule base, wherein the policy rule base comprises a masking policy rule base such that a given one of the at least two interfaces uses a first data unit identifier to represent a given set of related data blocks to a first set of external data systems and a second data unit identifier to represent the given set of related data blocks to a second set of external data systems,
   said primary backup system and said secondary backup system are configured for communicating with each other to determine which data backup segments are missing from each respective backup system and exchange said missing data backup segments with one another,
   said primary backup system and said secondary backup system are configured for determining which of said primary backup system and said secondary backup system includes a more complete copy of all data segments transmitted from the primary storage system,
   said primary backup system and said secondary backup system are configured for determining whether to utilize a unidirectional synchronization or a bidirectional exchange when exchanging said missing data backup segments,
   said unidirectional synchronization is utilized when one of said primary backup system and said secondary backup system includes a substantially complete copy of all data segments transmitted from the primary storage system,
   said bidirectional exchange is utilized when said primary backup system and said secondary backup system both include less than a substantially complete copy of all data segments transmitted from the primary storage system, said secondary backup system is structured and configured for synchronously backing up data stored in the primary storage system when said primary backup system is malfunctioning, said secondary backup system is structured and configured for asynchronously backing up data stored in the primary storage system when said primary storage system and said primary backup system are both functioning properly, and said primary backup system is further structured and configured for determining that the first communication link is substantially busy and directing, via the second communication link, one or more I/O operations directed to the primary storage system to the primary backup system to alleviate at least a portion of a load on the first communication link.

2. The data storage system according to claim 1, wherein: each of said at least two interfaces includes a dynamic communication port configured to communicate with said primary backup system, said secondary backup system, and said one or more data clients.

3. The data storage system according to claim 2, wherein said primary backup system is structured and configured for synchronously backing up data stored in the primary storage system when said primary storage system and said primary backup system are functioning properly.

4. The data storage system according to claim 3, wherein said primary backup system is further structured and configured for determining that the first communication link is substantially busy and directing, via the second communication link, one or more I/O operations directed to the primary storage system to the primary backup system to alleviate at least a portion of a load on the first communication link.

5. A method for mirroring data in a data storage system comprising a primary storage system comprising one or more servers and at least two interfaces coupled to said one or more servers, each coupled to one or more data clients via a first communication link, a primary backup system coupled to said primary storage system and to said one or more data clients via a second communication link, and a secondary backup system coupled to said primary storage system and said primary backup system, said method comprising:

communicating, by said primary backup system and said secondary backup system, with each other to determine which data backup segments are missing from each respective backup system and exchange said missing data backup segments with one another;

determining, by said primary backup system and said secondary backup system, which of said primary backup system and said secondary backup system includes a more complete copy of all data segments transmitted from the primary storage system;

determining, by said primary backup system and said secondary backup system, whether to utilize a unidirectional synchronization or a bidirectional exchange when exchanging said missing data backup segments;

utilizing said unidirectional synchronization to exchange said missing data backup segments when one of said primary backup system and said secondary backup system includes a substantially complete copy of all data segments transmitted from the primary storage system;

utilizing said bidirectional exchange to exchange said missing data backup segments when said primary backup system and said secondary backup system both include less than a substantially complete copy of all data segments transmitted from the primary storage system;

synchronously backing up, by said secondary backup system, data stored in the primary storage system when said primary backup system is malfunctioning;

asynchronously backing up, by said secondary backup system, data stored in the primary storage system when said primary storage system and said primary backup system are both functioning properly;

determining, by said primary backup system, that the first communication link is substantially busy; and directing, by said primary backup system via the second communication link, one or more I/O operations directed to the primary storage system to the primary backup system to alleviate at least a portion of a load on the first communication link;

wherein each of said at least two interfaces is configured to provide said primary backup system, said secondary backup system, and said one or more data clients with access to said primary data storage system based on a policy rule base, and further wherein the policy rule base comprises a masking policy rule base such that a given one of the at least two interfaces uses a first data unit identifier to represent a given set of related data blocks to a first set of external data systems and a second data unit identifier to represent the given set of related data blocks to a second set of external data systems.

6. The method according to claim 5, further comprising communicating, by each of said at least two interfaces via a dynamic communication port, with said primary backup system, said secondary backup system, and said one or more data clients.

7. The method according to claim 6, further comprising synchronously backing up, by said primary backup system, data stored in the primary storage system when said primary storage system and said primary backup system are functioning properly.

8. The method according to claim 7, further comprising determining, by said primary backup system, that the first communication link is substantially busy and directing, via the second communication link, one or more I/O operations directed to the primary storage system to the primary backup system to alleviate at least a portion of a load on the first communication link.

9. A non-transitory computer storage medium comprising a computer program product method for mirroring data in a data storage system comprising a primary storage system comprising one or more servers and at least two interfaces coupled to said one or more servers, each coupled to one or more data clients via a first communication link, a primary backup system coupled to said primary storage system and to said one or more data clients via a second communication link, and a secondary backup system coupled to said primary storage system and said primary backup system, said computer storage medium comprising:

computer code for communicating, by said primary backup system and said secondary backup system, with each other to determine which data backup segments are missing from each respective backup system and exchange said missing data backup segments with one another;

computer code for determining, by said primary backup system and said secondary backup system, which of said primary backup system and said secondary backup system includes a more complete copy of all data segments transmitted from the primary storage system;

computer code for determining, by said primary backup system and said secondary backup system, whether to utilize a unidirectional synchronization or a bidirectional exchange when exchanging said missing data backup segments;

computer code for utilizing said unidirectional synchronization to exchange said missing data backup segments when one of said primary backup system and said secondary backup system includes a substantially complete copy of all data segments transmitted from the primary storage system;

computer code for utilizing said bidirectional exchange to exchange said missing data backup segments when said primary backup system and said secondary backup system both include less than a substantially complete copy of all data segments transmitted from the primary storage system;

computer code for synchronously backing up, by said secondary backup system, data stored in the primary storage system when said primary backup system is malfunctioning; and computer code for asynchronously backing up, by said secondary backup system, data stored in the primary storage system when said primary storage system and said primary backup system are both functioning properly;

computer code for determining, by said primary backup system, that the first communication link is substantially busy; and computer code for directing, by said primary backup system via the second communication link, one or more I/O operations directed to the primary storage system to the primary backup system to alleviate at least a portion of a load on the first communication link;

wherein each of said at least two interfaces is configured to provide said primary backup system, said secondary backup system, and said one or more data clients with access to said primary data storage system based on a policy rule base, and further wherein the policy rule base comprises a masking policy rule base such that a given one of the at least two interfaces uses a first data unit identifier to represent a given set of related data blocks to a first set of external data systems and a second data unit identifier to represent the given set of related data blocks to a second set of external data systems.

10. The computer storage medium according to claim 9, further comprising:
computer code for communicating, by each of said at least two interfaces via a dynamic communication port, with said primary backup system, said secondary backup system, and said one or more data clients.

11. The computer storage medium according to claim 10, further comprising computer code for synchronously backing up, by said primary backup system, data stored in the primary storage system when said primary storage system and said primary backup system are functioning properly.

12. The computer storage medium according to claim 11, further comprising computer code for determining, by said primary backup system, that the first communication link is substantially busy and directing, via the second communication link, one or more I/O operations directed to the primary storage system to the primary backup system to alleviate at least a portion of a load on the first communication link.

* * * * *